US012811522B2

(12) United States Patent
Jennings et al.

(10) Patent No.: US 12,811,522 B2
(45) Date of Patent: Nov. 24, 2026

(54) STEPPER MOTOR CONTROL SYSTEMS AND METHODS FOR ACTUATORS

(71) Applicant: Delaware Capital Formation, Inc., Wilmington, DE (US)

(72) Inventors: Benjamin J. Jennings, Kent, WA (US); Anjan Archarya Ganguli, Bangalore (IN); Brian A. Knobloch, Chesterfield, MI (US); James W. Geary, Pawcatuck, CT (US); Christopher D. D'Spain, Milford, MI (US); Joshua M. Evans, Warren, MI (US)

(73) Assignee: Stabilus Motion Controls GmbH, Langenfeld (DE)

( * ) Notice: Subject to any disclaimer, the term of this patent is extended or adjusted under 35 U.S.C. 154(b) by 339 days.

(21) Appl. No.: 18/199,718

(22) Filed: May 19, 2023

(65) Prior Publication Data

US 2024/0388228 A1 Nov. 21, 2024

(51) Int. Cl.
*H02P 8/22* (2006.01)
*B25J 9/12* (2006.01)

(52) U.S. Cl.
CPC ................ *H02P 8/22* (2013.01); *B25J 9/126* (2013.01)

(58) Field of Classification Search
CPC . B25J 15/026; B25J 9/126; H02P 8/22; H02P 8/14
See application file for complete search history.

(56) References Cited

U.S. PATENT DOCUMENTS 3,063,708 A 11/1962 Wollenhaupt
4,072,888 A 2/1978 Bechtle et al.
4,600,357 A 7/1986 Coules
4,680,523 A 7/1987 Goumas et al.
4,693,505 A 9/1987 DiMeo
4,700,936 A 10/1987 Lunn
(Continued)

FOREIGN PATENT DOCUMENTS

CN 204612913 U 9/2015
CN 108326885 A 7/2018
(Continued)

OTHER PUBLICATIONS

Extended European Search Report dated Nov. 4, 2024 in corresponding European Application No. 24176516.3.

*Primary Examiner* — Said Bouziane
(74) *Attorney, Agent, or Firm* — Harness, Dickey & Pierce, P.L.C.

(57) ABSTRACT

A stepper motor control system includes: a stepper motor configured to actuate an actuator to engage an object; a power control module configured to: during a first period before compression of a compliance mechanism occurs, apply electrical pulses to stator coils of the stepper motor in a predetermined order and based on a first predetermined torque and a first predetermined speed, where compression of the compliance mechanism occurs when the actuator contacts the object; and during a second period after the compression of the compliance mechanism occurs, apply a predetermined number of extra pulses to the stator coils of the stepper motor in the predetermined order and based on a second predetermined torque and a second predetermined speed.

20 Claims, 14 Drawing Sheets

(56) References Cited

U.S. PATENT DOCUMENTS

| | | | |
|---|---|---|---|
| 5,054,836 | A | 10/1991 | Schulz |
| 5,671,962 | A | 9/1997 | Otsuka et al. |
| 6,331,758 | B1 | 12/2001 | Takanashi et al. |
| 6,345,815 | B1 | 2/2002 | Takanashi et al. |
| 6,726,194 | B2 | 4/2004 | Migliori |
| 8,052,130 | B2 | 11/2011 | Huang |
| 8,235,437 | B2 | 8/2012 | Geary et al. |
| 8,991,886 | B2 | 3/2015 | Schuster et al. |
| 9,281,775 | B2 | 3/2016 | Kroell et al. |
| 9,656,393 | B2 | 5/2017 | Becker et al. |
| 9,815,193 | B2 | 11/2017 | Trujillo et al. |
| 10,011,019 | B1 | 7/2018 | Strauss |
| 10,016,901 | B2 | 7/2018 | Strauss |
| 10,265,849 | B2 | 4/2019 | Trujillo et al. |
| 10,399,224 | B2 | 9/2019 | Wong et al. |
| 10,434,662 | B2 | 10/2019 | Jalenques |
| 10,933,536 | B2 | 3/2021 | Strauss |
| 2009/0224719 | A1* | 9/2009 | Shimada .............. H04N 23/651 318/696 |
| 2019/0143516 | A1* | 5/2019 | Wong ..................... B25J 9/1664 700/250 |
| 2021/0284461 | A1* | 9/2021 | Ditner ....................... H02P 5/68 |

FOREIGN PATENT DOCUMENTS

| | | | |
|---|---|---|---|
| CN | 112846844 | A | 5/2021 |
| CN | 214959160 | U | 11/2021 |
| CN | 217551785 | U | 10/2022 |
| DE | 3606874 | A1 | 9/1987 |
| DE | 4005334 | C2 | 4/1994 |
| JP | H08-001463 | B2 | 1/1996 |
| JP | H10-277983 | A | 10/1998 |
| JP | 2008-237560 | A | 10/2008 |
| JP | 58-15923 | B2 | 11/2015 |
| KR | 100536034 | B1 | 12/2005 |
| TW | 1357471 | B | 2/2012 |
| WO | WO-2006-030520 | A1 | 3/2006 |
| WO | WO-2012-098813 | A1 | 7/2012 |

* cited by examiner

STEPPER MOTOR CONTROL SYSTEMS AND METHODS FOR ACTUATORS

FIELD

The present disclosure relates to object engagement systems and methods and more particularly to systems and methods for controlling stepper motors of grippers used to grip/grasp objects.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a gripper, the general motion of the gripper, be it pneumatic or electric, involves closing the fingers through a clearance zone (stroke) until the fingers reach the part where they can then apply a gripping force. Fingers travel through the gripper stroke from a home or ready to grip position with high speed and very little force. Ordinarily, just enough force to accelerate the gripper's components and overcome friction is applied. When the fingers contact the part, the gripper stops moving and builds a holding force. In many of the existing designs, the actuator may be continually energized to maintain the grip force on the part. Loss of this force means dropping the part. Thus, pneumatic grippers with a pneumatic cylinder are utilized due to their low cost and effective gripping of the part. However, in environments where fluid is not optimal, an electric gripping device is utilized. However, these electric gripping devices often require complex controllers to operate the gripper. This adds costs as well as complexity to the gripper.

Thus, it would be desirable to have an electric gripper that is cost competitive with pneumatic grippers while providing a simple controller. Accordingly, the present disclosure is such a device.

The present disclosure provides a compliant stepper motor drive system that combines a compliance device and a controller (control module) that can drive a common stepper motor to generate force at any known or unknown location in its travel. Stepper motors are normally used only with known loads and known position-based applications. The present disclosure provides a stepper motor with a stall-detecting controller along with a compliance device to generate predictable, repeatable force in a myriad of mechanical devices. The stepper motors are advantageous due to their low cost, ease of control, higher power density, high torque at low speeds, and open-loop positioning capability. The present disclosure provides a controller (control module) that may detect when the stepper motor is approaching its stall torque without using an encoder or sensor by monitoring the back electromagnetic field voltage (EMF) of the motor.

SUMMARY

According to a first aspect of the disclosure, a gripper device comprises a body with a stepper motor positioned within the body. A lead screw is driven by the stepper motor. A gripper is coupled with the lead screw to grip and release a part. A compliance is mounted between the body and the motor to enable movement of the motor with respect to the body. A controller is electrically coupled with the motor which can learn and save various positions such as "open" and "gripped on part" by counting motor commutations. The gripper includes a wedge coupled with the lead screw and a pair of jaws that move the pair of jaws and fingers between an open and gripping position. The controller senses when a stop has been encountered (such as a workpiece or end of jaw travel) and can respond with the appropriate change in speed torque, and/or signal outputs. The stepper motor, when moving from the open position to the gripping position, has low torque and moves at high speed. When a stop is detected on a part, the stepper motor is configured to move with high torque and low speed. The controller then moves the stepper motor further, deflecting the compliance member by a predetermined number of steps to provide a desired force on the part without reaching a stall. This deflection of the compliance member develops a force on the part according to its modulus of elasticity. The controller reports out the gripper's position if it is at one of the previously taught locations. The controller saves energy by powering down the stepper motor with the gripper maintaining the gripping force mechanically. The controller can provide further braking by shorting the motor coils, thus creating a back-EMF brake.

According to a second aspect of the disclosure, a stepper motor drive system comprises a stepper motor to be coupled with a mechanical ground and a shaft driven by the stepper motor. A load coupled with the shaft for moving the load. A compliance device enables the stepper motor to apply force to the load. A controller electrically coupled with the motor which can learn and save various positions by counting motor commutations. The controller senses when a stop has been encountered and changes current to the stepper motor. The stepper motor, when moving to locations, has low torque and moves at high speed. When a stop is detected, the stepper motor changes to a high torque and low speed. The controller then moves the stepper motor further, deflecting the compliance member by a predetermined number of steps to provide a desired force on a part. This deflection of the compliance member develops a force on the part according to its modulus of elasticity. The controller can report out the position if it is at one of the previously taught locations. The controller may save energy by powering down the stepper motor with the actuator maintaining the force mechanically. The controller can provide further braking by shorting the motor coils, thus creating a back-EMF brake.

In a feature, a stepper motor control system includes: a stepper motor configured to actuate an actuator to engage an object; a power control module configured to: during a first period before compression of a compliance mechanism occurs, apply electrical pulses to stator coils of the stepper motor in a predetermined order and based on a first predetermined torque and a first predetermined speed, where compression of the compliance mechanism occurs when the actuator contacts the object; and during a second period after the compression of the compliance mechanism occurs, apply a predetermined number of extra pulses to the stator coils of the stepper motor in the predetermined order and based on a second predetermined torque and a second predetermined speed.

In further features, the stepper motor is one of a linear stepper motor and a rotary stepper motor.

In further features, the actuator is a gripper.

In further features, the power control module is configured to apply the predetermined number of extra pulses to the stator coils of the stepper motor in the predetermined order based on the second predetermined torque and the second predetermined speed.

In further features, the power control module is configured to apply the predetermined number of extra pulses to the stator coils of the stepper motor in the predetermined order based on a third predetermined torque that is one of less than and greater than the second predetermined torque.

In further features, the power control module is configured to apply the predetermined number of extra pulses to the stator coils of the stepper motor in the predetermined order based on a third predetermined speed that is one of less than and greater than the second predetermined speed.

In further features, the second predetermined torque is greater than the first predetermined torque.

In further features, the first predetermined speed is greater than the second predetermined speed.

In further features, a contact module is configured to indicate whether compression of the compliance mechanism is occurring based on a back electromagnetic field (EMF) voltage of one or more of the stator coils of the stepper motor.

In further features, the contact module is configured to indicate that compression of the compliance mechanism is occurring when the back EMF voltage changes in a predetermined manner.

In further features, the contact module is configured to indicate that compression of the compliance mechanism is occurring when the back EMF voltage is greater than a predetermined back EMF value.

In further features, the contact module is configured to indicate that compression of the compliance mechanism is not occurring when the back EMF voltage is less than the predetermined back EMF value.

In further features, the contact module is configured to indicate that compression of the compliance mechanism is not occurring when a rate of change of the back EMF voltage is one of less than and greater than a predetermined rate of change.

In further features, the power control module is configured to apply electrical pulses to the stator coils of the stepper motor in the predetermined order and based on the second predetermined torque and the second predetermined speed until the predetermined number of extra pulses have been applied.

In further features: the first predetermined torque corresponds to a first predetermined current of electrical pulses; the second predetermined torque corresponds to a second predetermined current of electrical pulses; and the second predetermined current is greater than the first predetermined current.

In further features: the first predetermined speed corresponds to a first predetermined rate of applying electrical pulses to the stepper motor; the second predetermined speed corresponds to a second predetermined rate of applying electrical pulses to the stepper motor; and the first predetermined rate is faster than the second predetermined rate.

In further features, the power control module is configured to disconnect the stepper motor from electrical power when the predetermined number of extra pulses have been applied to the stator coils of the stepper motor.

In further features, a training module is configured to determine the predetermined number of extra pulses to apply to the stator coils during actuation of the actuator and to store the predetermined number of extra pulses in the memory.

In further features, the training module is configured to determine the predetermined number of extra pulses to apply based on a difference between (a) a first number of pulses applied to the stepper motor during the first period and (b) a second number of pulses applied to the stepper motor between (i) when the second period began and (ii) the actuator contacted one or more hard stops.

In a feature, a stepper motor control method includes: during a first period before compression of a compliance mechanism occurs, applying electrical pulses to stator coils of a stepper motor in a predetermined order and based on a first predetermined torque and a first predetermined speed, where the stepper motor is configured to actuate an actuator to engage an object, and where compression of the compliance mechanism occurs when the actuator contacts the object; and during a second period after the compression of the compliance mechanism occurs, applying a predetermined number of extra pulses to the stator coils of the stepper motor in the predetermined order and based on a second predetermined torque and a second predetermined speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
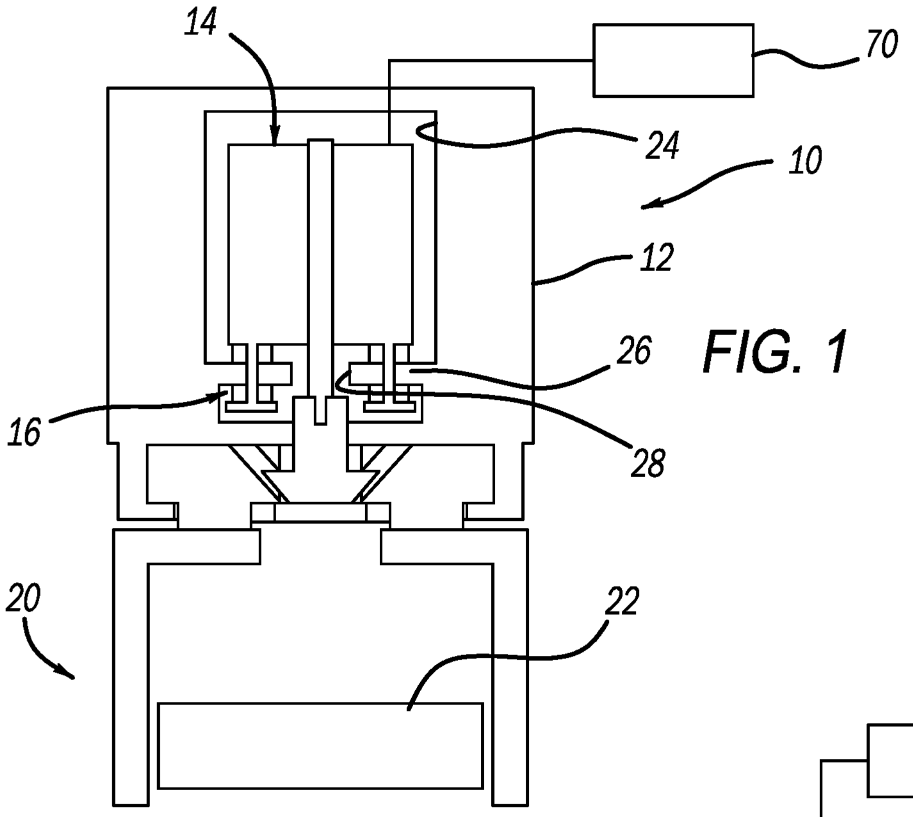
FIG. 1 is a schematic view of a gripper in an open position.
Figure 2:
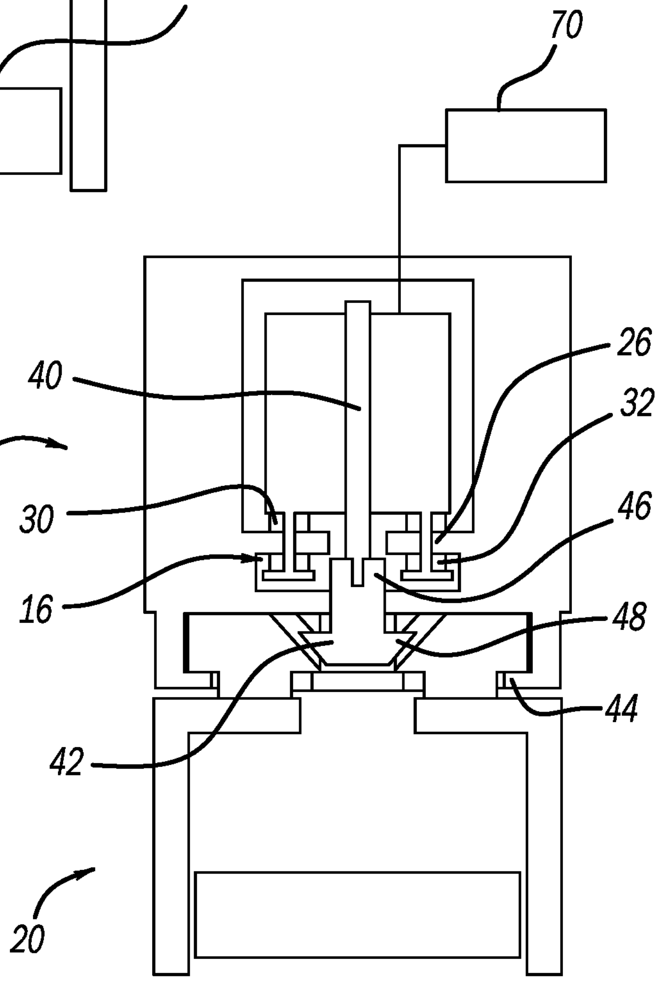
FIG. 2 is a schematic view of FIG. 1 with the fingers traveling to the part.
Figure 3:
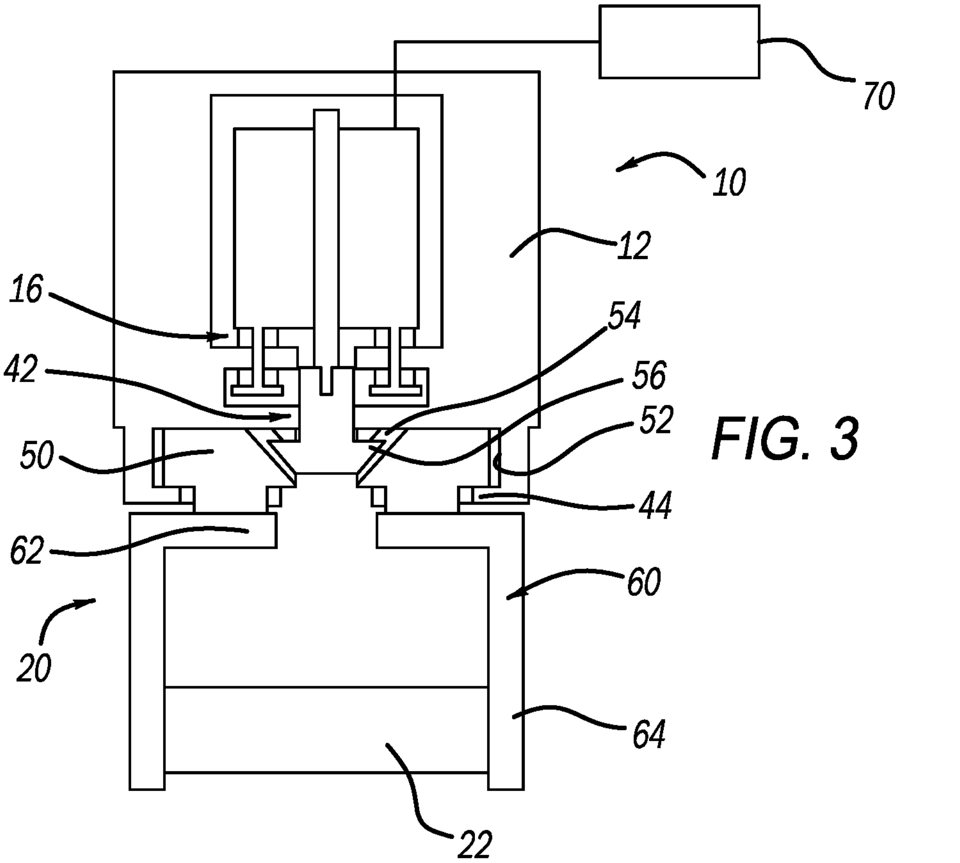
FIG. 3 is a schematic view of the gripper with the part in a retained position.

Turning to the figures, a gripper is illustrated and designated with the reference numeral 10. The gripper includes a housing body 12 that houses a stepper motor 14. A compliance device 16 is positioned between the body 12 and the stepper motor 14. A gripper 20 is coupled with the stepper motor 14 to move between a first and second position to release and grip a part 22.

The body 12 includes a cavity 24 that receives the stepper motor 14. A flange or shelf 26 extends from the wall defining the cavity and provides a bore 28. The compliance device 16 is positioned between the body 12 and the stepper motor 14 to enable the motor 14 to move axially building up force in the compliance device. The compliance device 16 includes first pads 30 and second pads 32. The pads 30, 32 are positioned on opposite side of the shelf 26. Also, a fastener secures the pads 30, 32 in place with respect to the body shelf 26 and the stepper motor 14. The elastomeric pads 30, 32 compress when the stepper motor 14 moves and provide repeatable spring constant and apply an increasing load as they become further compressed. The compliance device 16 can be an elastomeric pad, spring or the like.

The resilience compliance device 16 cushions the impact loads to generate, regulate and stabilize the output force. The compliance device 16 enables force to be gradually increased to increase the load. The load increases and decreases on the desired side of the shelf in order to load and unload the stepper motor 14.

The gripper 20 includes a lead screw or shaft 40 that is rotationally coupled with the stepper motor 14. The lead screw 40 can have fine threads that enhance the locking position of the gripper 20 when the power to the stepper motor 14 is turned off or is terminated.

A wedge 42 is coupled with the lead screw 40. As the stepper motor 14 rotates in a first and reverse second direction, the wedge 42 is driven toward and away from the body ledge 44 to control the stepper motor 14 and gripper 20 as will be explained later. The wedge 42 has a securement portion 46, with a threaded bore, to secure with the lead screw 40. An arrow shaped portion 48 enhances movement of the gripper 20.

Jaws 50 are secured within a channel 52 within the body 12. The jaws 50 include a groove 54 that receives and enables the tips 56 of the wedge arrow portion 48 to ride along the grooves 44. As the wedge 42 ridges along the grooves 54, the jaws 50 are moved toward and away from one another. This moves the gripper between the open and gripping positions.

The jaws 50 are secured to fingers 60. The fingers 60, as illustrated, have an overall L-shape. However, the fingers can be of any geometry required to hold the workpiece. One portion 62 of the fingers is secured to the jaws 50 while the other portion 64 extends away from the jaws for gripping the part 22. Thus, as the stepper motor 14 is rotated in a first and second reverse direction, the fingers 60 clamp and release the part 22.

A controller 70 (control module discussed further below) is electrically coupled with the stepper motor 14.

The compliance device 16 enables non-synchronous motion between the stepper motor 14 and the gripper 20. The controller 70, during operation of the stepper motor 14, detects when the motor is approaching its stall torque caused by the compliance device resistance forces. The controller, when detecting this approaching stall torque, changes the parameters of the motor to continue further movement of the fingers into the compliance zone. The controller in this application is taught a home position and one or more preset positions taught by the user. When the fingers 60 touch the part 22, the controller 70 detects the approach of a stall of the stepper motor 14, since the stepper motor is in a low torque mode and cannot overcome the compliance device resistance force. Immediately, the controller 70 reconfigures the motion parameters moving to a high torque, low speed mode. The stepper motor 14 supplies high torque at low speeds. The stepper motor 14 continues to increase the force through the motor into the compliance device 16. The compliance device 16 deflects and, like a spring develops a force proportional to its deflection.

The deflection force is transmitted to the gripper 20 generating a gripping force on the part 22. The controller 70, from the initial teaching, knows how many steps to deflect the compliance device thus yielding a consistent repeatable grip force. In turn, this enables the set point to be identified as a specific taught point. The stepper motor 14 deflects the compliance device 16 by a predetermined number of steps to develop gripping force. The controller 70 stops after the predefined number of steps before the motor can stall, in this high current, low speed mode. The stepper motor 14 can then be powered off, and due to the fine pitch of the lead screw, the gripper 20 will maintain the grip force. This enables the part 22 to be held for any length of time with full grip force without the need for power. This is an advantage in energy savings, in a power loss situation, as well as in reducing the gripper temperature by not having to be powered when gripping. The stepper motor controller 70 can generate back EMF braking by short circuiting the stepper motor's 14 coils when power is removed. This generates an additional braking effect that augments the lead screw failsafe further ensuring the failsafe gripping condition when the power is lost.

When opening the gripper, a similar high current, high torque low speed moves, unscrews the lead screw. The motor travels in a mode until it has traveled the same number of steps it used in loading the gripper but in an opposite direction. At this point, the grip force is reduced as the compliance device unloads. The gripper then continues opening with low torque and high speed until it reaches its home position.

Turning to FIGS. 4-23, additional embodiments are shown. As mentioned above, a control system is devised to control the stepper motors where the stepper motors mechanical output can be run to an unknown stopping location to apply a force. Normally, the stepper motors stall when applying a force at a non-predefined location. The control system relies on a mechanical compliance within the mechanical system in order to operate. The compliance can be in the motor mounting, the motor output, the load itself or any combination thereof. The compliance can be bi-directional, however, some applications only need unidirectional compliance.

The following are discussions of schematic illustrations of various stepper motors and compliance devices.

FIGS. 4-7 illustrate a rotary stepper motor with a rotating shaft. The rotating motor 110 includes a shaft 112. The motor 110 is mounted to ground via a bracket 114. A plurality of radial compliance 116 surrounding bolts 124 secure the motor 110 with the bracket 114. The radial compliance 116, such as a bearing or the like, surrounding bolts 124 allow the motor to comply radially. Also, the shaft 112, such as a spring, includes a radial compliance coupling 118 with a load such as a rotating disk 120 at the other side of the coupling 118. The radially compliant coupling 118 is attached to the load 120 enabling rotation of it. Thus, the design of the rotary stepper motor 110 includes a dual compliance.

Figure 4:
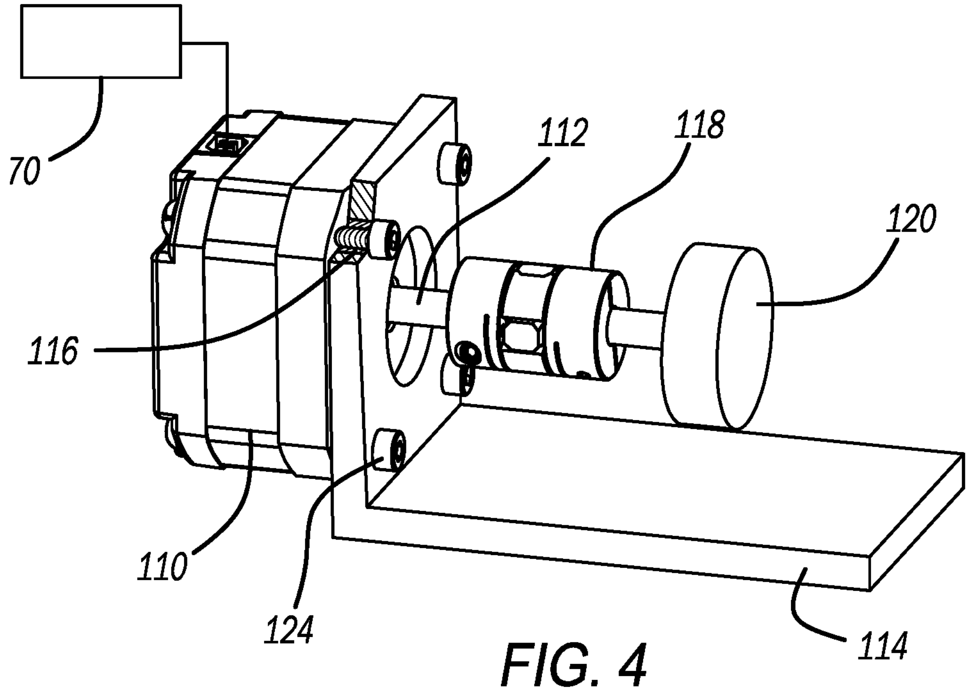
FIG. 4 is a schematic view of a rotary stepper motor drive system.
Figure 5:
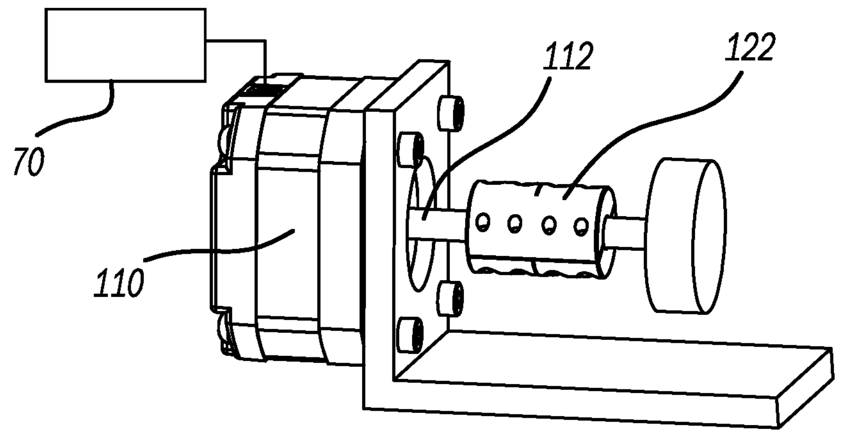
FIG. 5 is a schematic view like FIG. 4 with alternative compliance.

FIG. 5 is an embodiment similar to FIG. 4. The reference numerals, which are the same, are identified as such. FIG. 5 includes a motor 110 and a bracket 114 secured to the motor via radial compliance 116 surrounding bolts 124. The rotating shaft 112 includes a rigid coupling 122. Also, the load 120 is coupled at one end of the rigid coupling 122. Thus, the motor housing is mounted to ground via the bracket 114 and radial compliance members 116 enabling the motor to comply radially. The radially rigid coupling 122 attaches the rotating shaft 112 to the load 120. Thus, the compliance is between ground and the motor 110.

Figure 6:
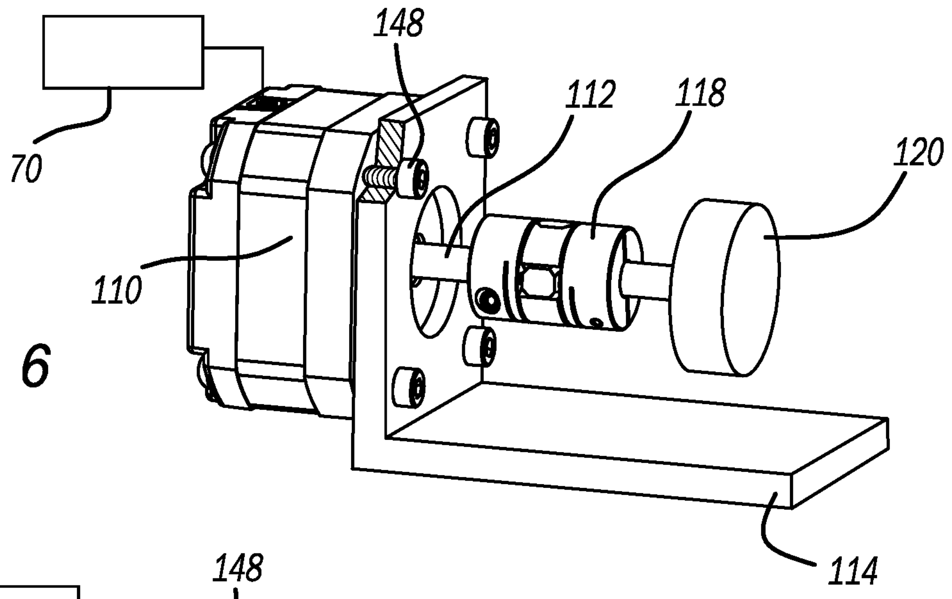
FIG. 6 is a schematic view like FIG. 4 with alternative compliance.

Turning to FIG. 6, a similar design is shown. Here, the motor 110 is secured to the bracket 114 via fasteners 148. The shaft 112 includes a radial compliant coupling 118 with the load 120. Thus, the radial compliance coupling 118 is coupled to the load 120. Accordingly, the compliance is between the motor 110 and the load 120.

Figure 7:
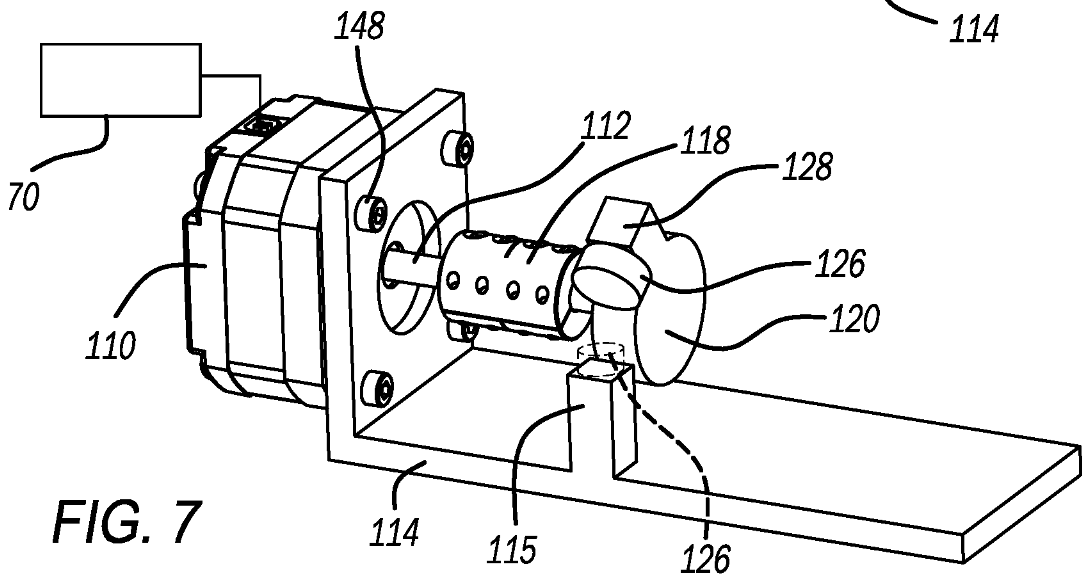
FIG. 7 is a schematic view like FIG. 4 with alternative compliance.
Figure 8:
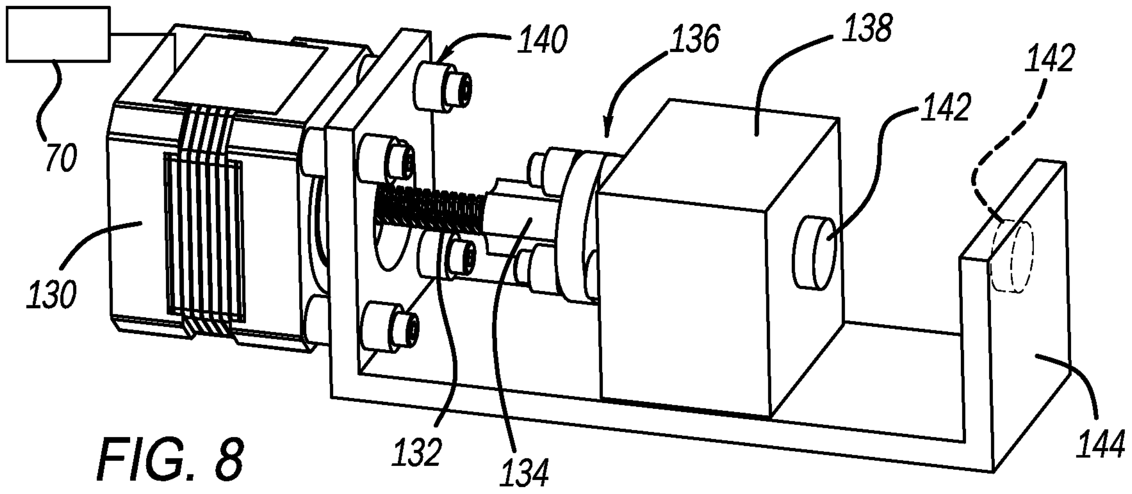
FIG. 8 is a schematic view of a linear stepper motor drive system with a rotating screw.

Turning to FIG. 7, the radial compliance 126 is illustrated on the load 120. The load 120 includes an arm 128 with the radial compliance 126. A member 115 projects from the bracket 114 to connect the load with ground via the bracket 114. Additionally, the radial compliance 126 could be on the member 115, as shown in phantom, and the arm 128 could contact it.

Turning to FIGS. 8-11, a rotating lead screw stepper motor 130 is illustrated affixed to a bracket 114. The stepper motor 130 includes a captive rotating lead screw 132, moving axially, coupled with a nut 134, which is a non-rotating nut constrained to the non-rotating load, including an axial compliant device 136 as well as the load 138. The motor 130 is secured to ground via the bracket 114 being held by an axial compliant device 140 which may include springs or elastomeric bushings or the like. The axial compliance device 136 can include springs or elastomeric bushings or the like that are positioned on opposite sides of a flange 136 and secure, via fasteners, with the load 138. Also, the load 138 includes an axial compliance device 142. The axial compliance device 142 connects the load 138 with ground via the bracket projecting member 144. Alternatively, the axial compliance device 142 could be on the projecting member 144, in phantom, and the load could contact it. Thus, the design illustrates a linear stepper motor with a rotating screw with triple compliance.

Figure 9:
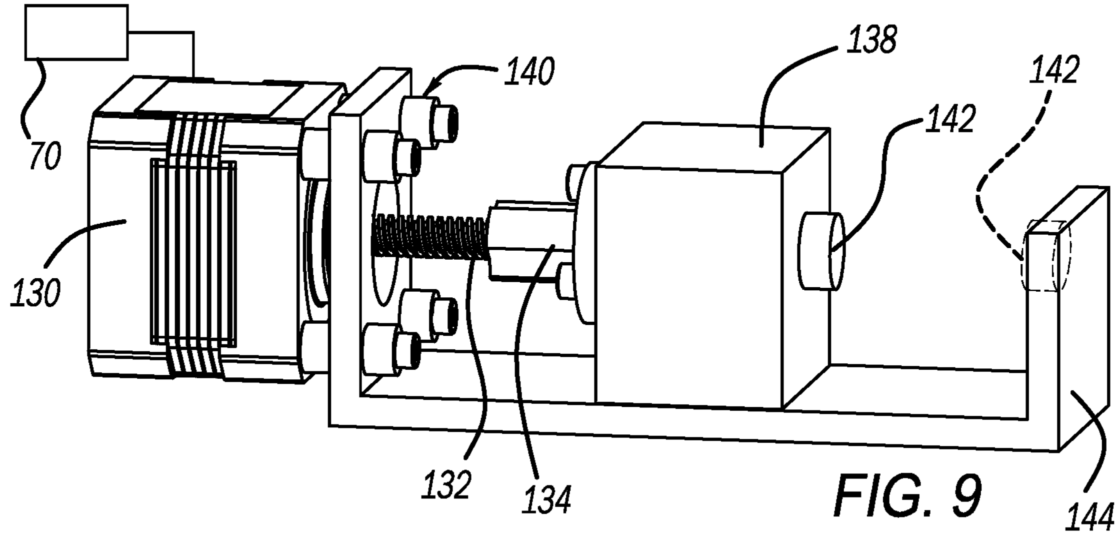
FIG. 9 is a schematic view like FIG. 8 with alternative compliance.

Turning to FIG. 9, the motor 130 is illustrated coupled to ground via the axial compliance devices 140 via the bracket 114. Here, the nut 134 is fixed to the load 138 without an axial compliance device. Thus, the linear stepper motor 130 with the rotating screw 132 has a compliance between the motor and ground. Also, the lead nut 134 is mounted to the load and moves it axially. The load 138 includes the axial compliance device 142 and the bracket includes the projecting member 144 as described above. The load provides for anti-rotation.

Figure 10:
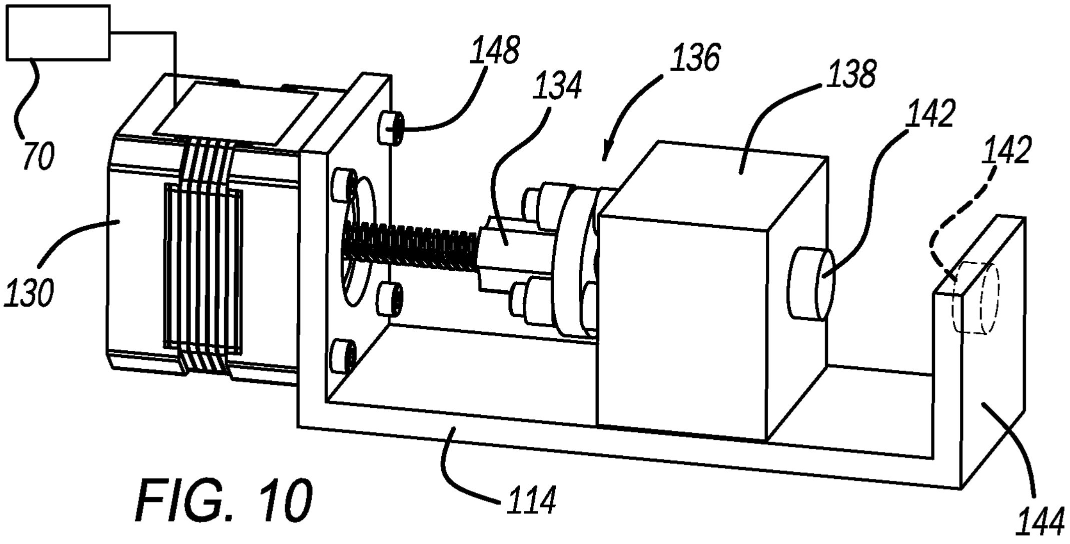
FIG. 10 is a schematic view like FIG. 8 with alternative compliance.

FIG. 10 illustrates the motor 130 secured by fasteners 148 to the bracket 114. Also, the nut 134 includes the axial compliance 136 secured to the load 138. Thus, a linear stepper motor 130 with a rotating screw 132, has the load compliance between the motor and the load 138. Also, the load 138 includes the axial compliance device 142 to abut the projecting member 144 as described above. Thus, axial compliance is between the nut and load or the load and ground where the load provides for the anti-rotation.

Figure 11:
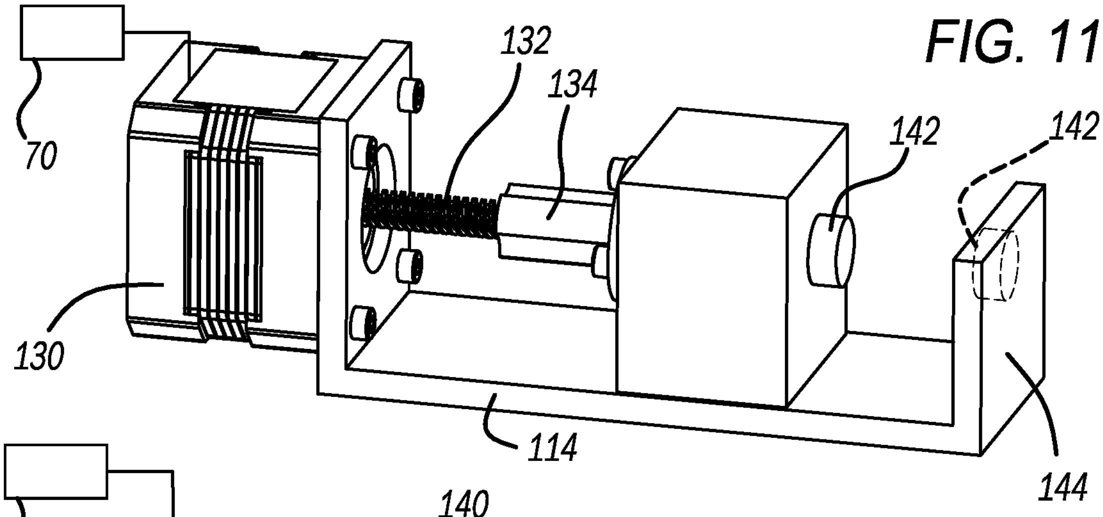
FIG. 11 is a schematic view like FIG. 8 with alternative compliance.
Figure 12:
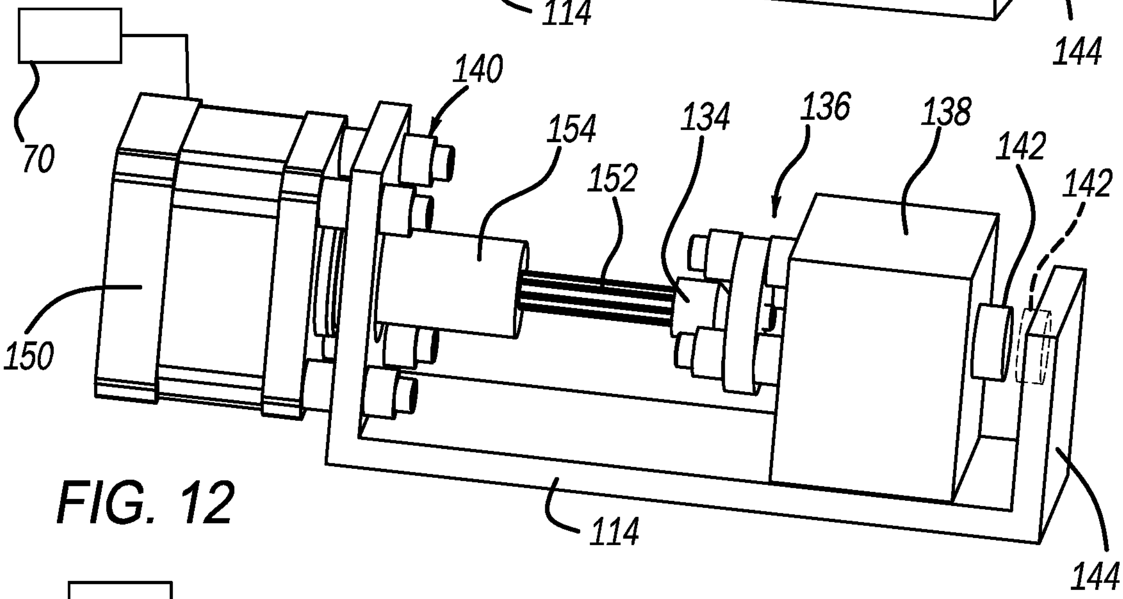
FIG. 12 is a schematic view of a liner stepper motor drive system with a captive screw and nut.

FIG. 11 illustrates the motor 130 secured by fasteners 148 to the bracket 114 and the screw 132 secured to nut 134 fixed to the load 138. Also, the load 138 includes the axial compliance device 142 to abut the projecting member 144 as described above.

FIGS. 12-15 illustrate a stepper motor with a captive screw and nut. The lead screw is affixed to the motors rotor and rotates with it. The lead nut is captive and does not move. The lead screw end is attached internally to a spline hollow shaft 152 that keeps the screw inside the motor that keeps it from rotating. Here, the motor 150 is mounted to the bracket 114 via axial compliances 140. The spline shaft 152 extends from the lead screw nut 154. An axial compliance device 136 is coupled with the load 138. The load adapter receives the spline shaft 152. Also, the load 138 includes an axial compliance device 142. The axial compliance device 142 connects the load 138 with ground via the bracket projecting member 144. Alternatively, the axial compliance device 142 could be on the projecting member 144, in phantom, and the load could contact it. Thus, the linear stepper motor with captive screw and nut includes a triple compliance with the compliance between the motor and the ground, the motor and the load, as well between the load and the ground.

Figure 13:
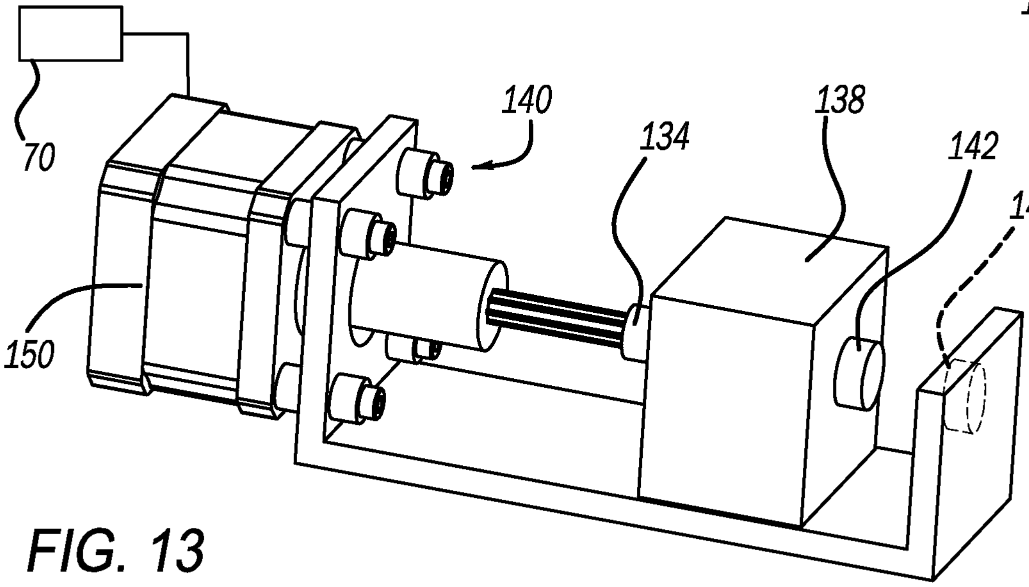
FIG. 13 is a schematic view like FIG. 12 with alternative compliance.

FIG. 13 illustrates the motor 150 secured to ground via the bracket 114 by the axial compliance members 140. The spline shaft 152 is connected to the load 138. Thus, the compliance is between ground and the motor or load and ground. Also, the load 138 includes the axial compliance device 142 to abut the projecting member 144 as described above.

Figure 14:
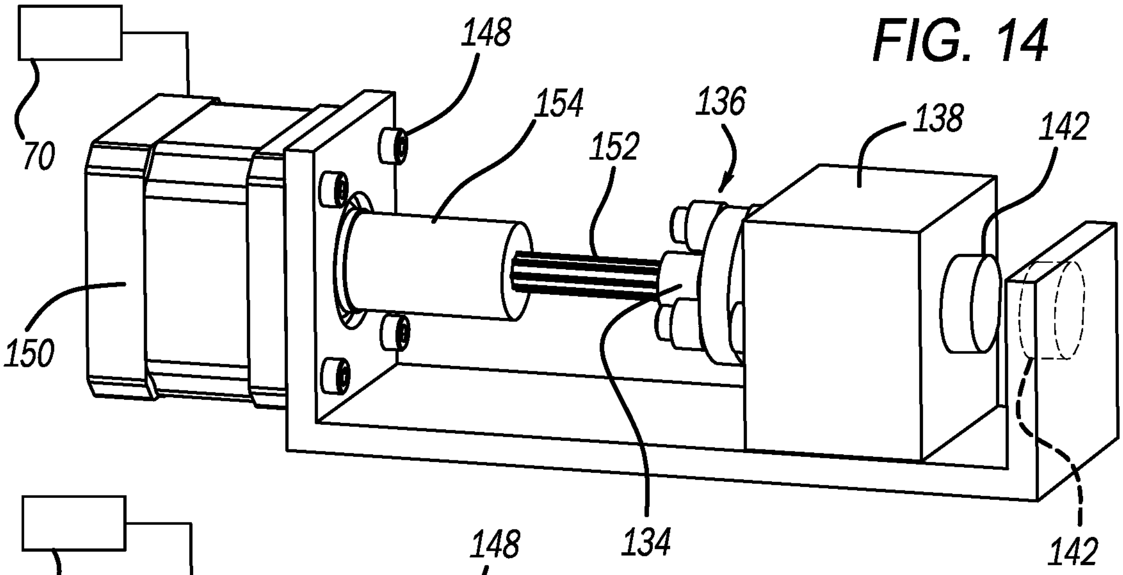
FIG. 14 is a schematic view like FIG. 12 with alternative compliance.

FIG. 14 illustrates the motor 150 secured to ground via the bracket 114 via fasteners 148. The internal lead screw moves the spline shaft 152 axially which is secured to the load 138 via nut and the axial compliance 136. Also, the load 138 includes the axial compliance device 142 to abut the projecting member 144 as described above. Accordingly, the linear stepper motor with captive screw and nut has a compliance between the motor and the load and the load and ground.

Figure 15:
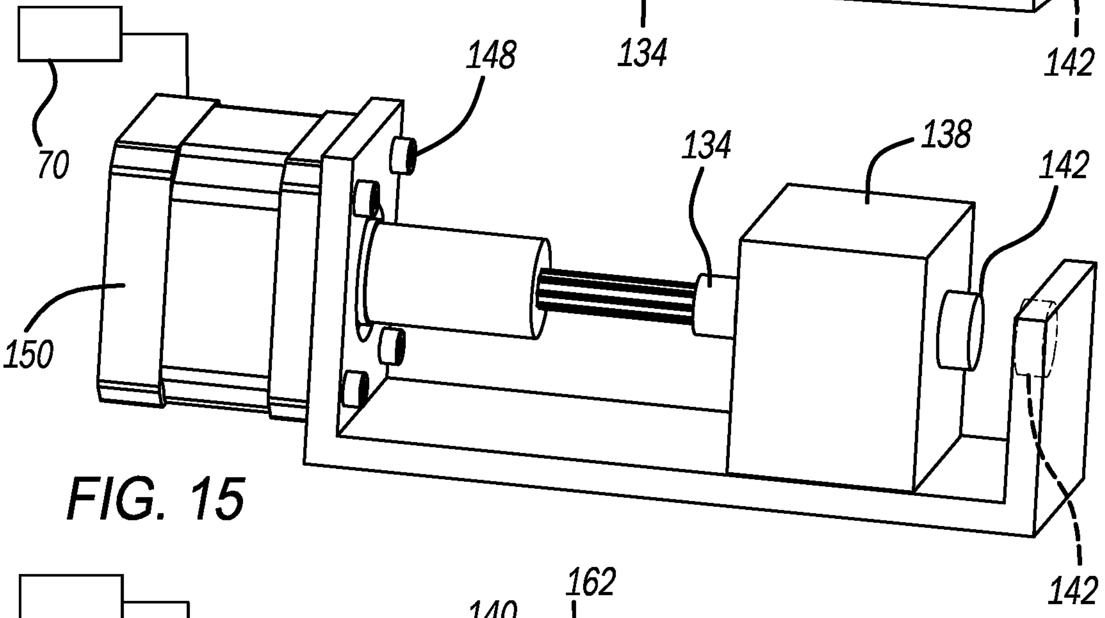
FIG. 15 is a schematic view like FIG. 12 with alternative compliance.
Figure 16:
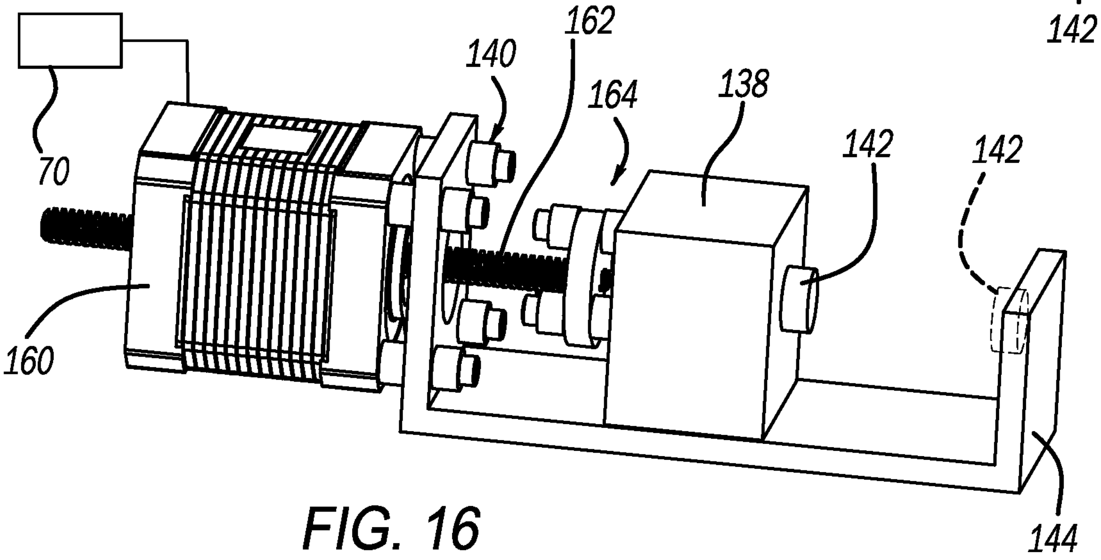
FIG. 16 is a schematic view of a linear stepper motor drive system with a rotating internal nut.

FIG. 15 illustrates the motor 150 secured by fasteners 148 to the bracket 114 and the shaft 152 secured to nut 134 fixed to the load 138. Also, the load 138 includes the axial compliance device 142 to abut the projecting member 144 as described above.

Figure 17:
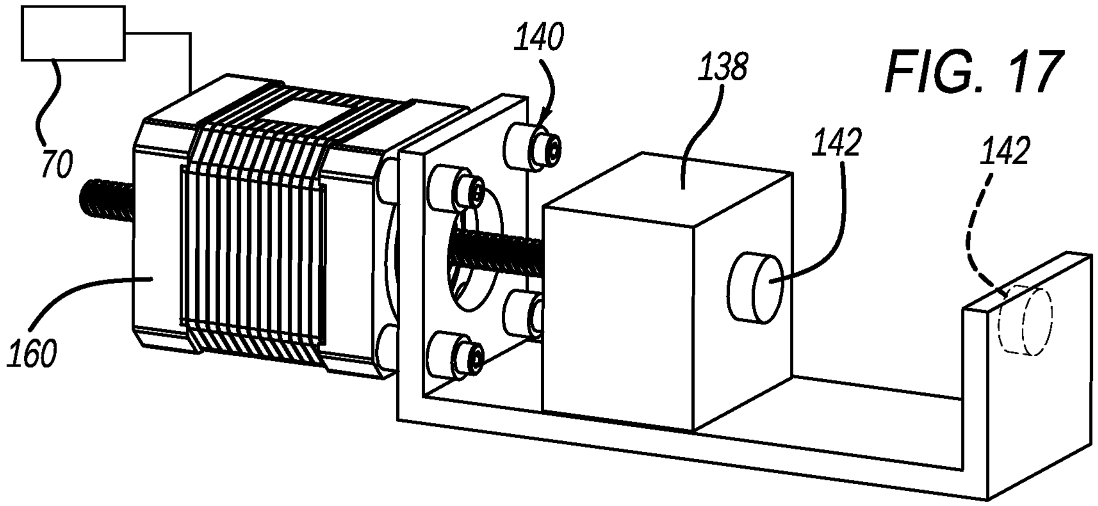
FIG. 17 is a schematic view like FIG. 16 with alternative compliance.

Turning to FIGS. 16-19, a linear stepper motor with a rotating internal nut is illustrated. The motor 160 is secured to the bracket 114 via the axial compliance devices 140. Likewise, the lead screw 162 is secured to the load adapter 164 which, in turn, is secured to the load 138 via the load adapter 164 and axial compliance members 136. Also, the load 138 includes the axial compliance device 142 to abut the projecting member 144 as described above. Thus, the linear stepper motor 160 with the rotating internal nut includes a triple compliance feature with compliance between ground and the motor, the motor and the load as well as a between the load and ground. Additionally, the load provides for anti-rotation. FIG. 17 illustrates the motor 160 coupled to ground via the bracket 114 and the axial compliance members 140. The lead screw 162 is directly secured with the load 138. Also, the load 138 includes the axial compliance device 142 to abut the projecting member 144 as described above. Additionally, the load provides for anti-rotation.

Figure 18:
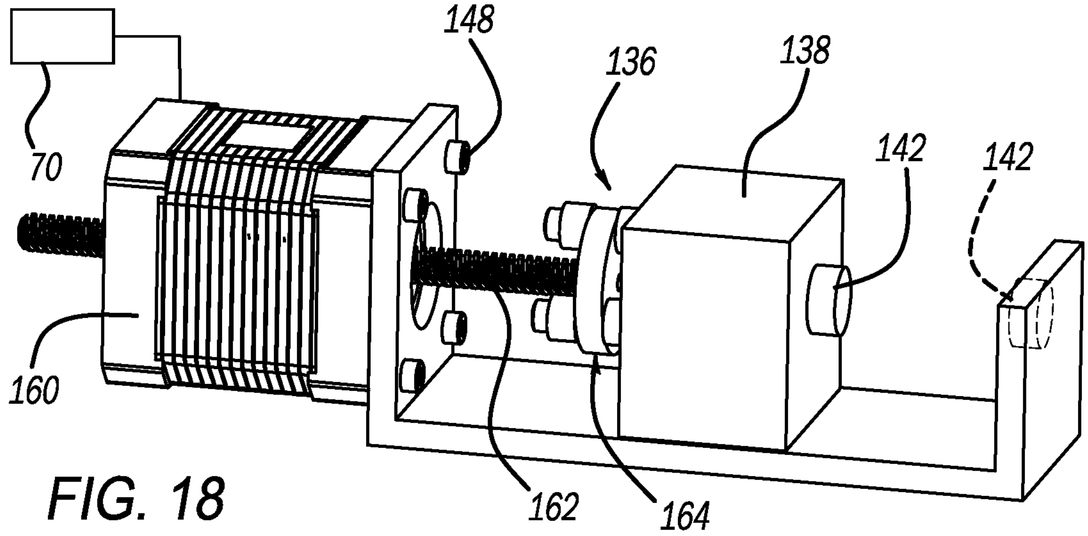
FIG. 18 is a schematic view like FIG. 16 with alternative compliance.

FIG. 18 illustrates the motor 160 with the lead screw 162 coupled with the load adapter 164 and, in turn, is secured with the load 138 via the axial compliance members 136. Also, the load 138 includes the axial compliance device 142 to abut the projecting member 144 as described above. Thus, the stepper motor 160 with the non-captive axial motion lead screw 112 output includes the axial compliance between the motor and the load and the load and ground. Additionally, the load provides for anti-rotation.

Figure 19:
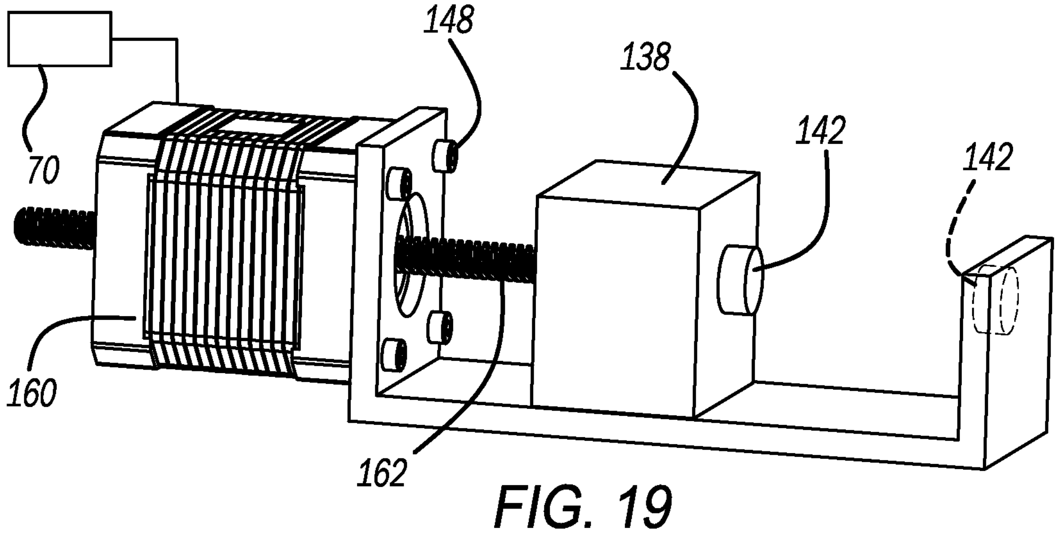
FIG. 19 is a schematic view like FIG. 16 with alternative compliance.
Figure 20:
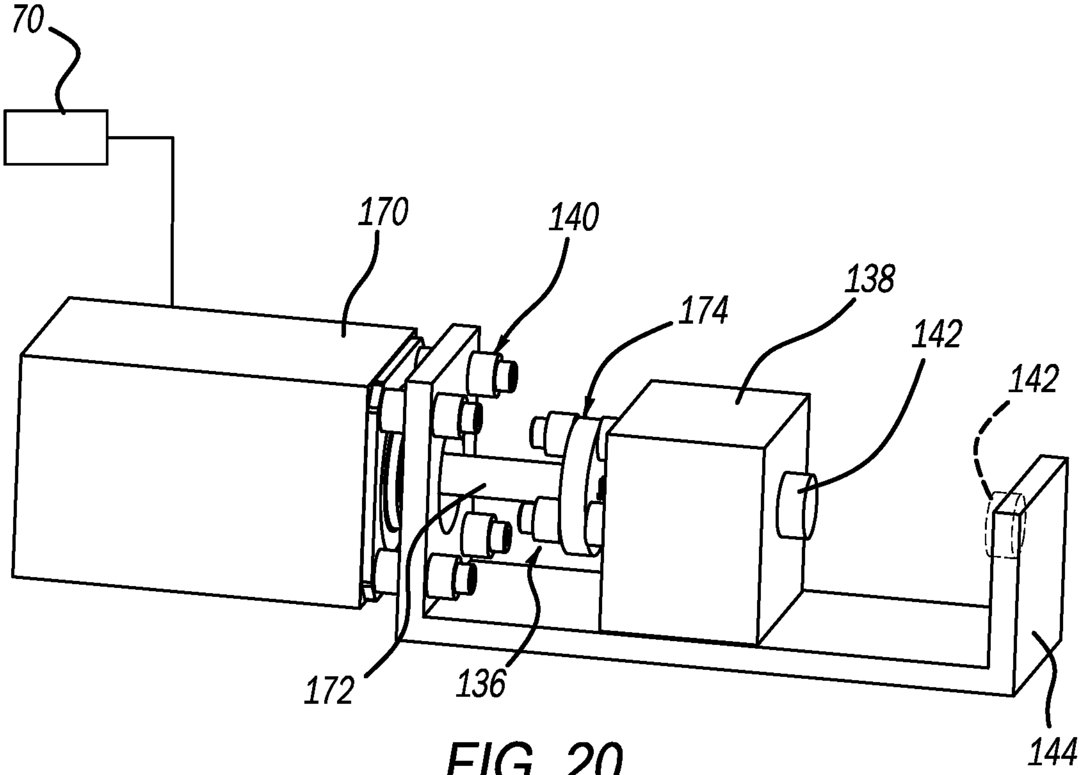
FIG. 20 is a schematic view of a direct linear stepper motor drive system.

FIG. 19 illustrates the motor 160 secured by fasteners 148 to the bracket 114 and the screw 162 is secured to the load 138. Also, the load 138 includes the axial compliance device 142 to abut the projecting member 144 as described above. Additionally, the load provides for anti-rotation.

Turnings to FIGS. 20-23, a linear stepper motor is illustrated. The linear stepper motor, in FIG. 20, includes a triple compliance. The linear stepper motor 170 is secured to the bracket 114 via the axial compliance members 140. The axial moving shaft 172 is secured with the load adapter 174 which, in turn, is secured to the load 138 via the axial compliance members 136. Thus, a triple compliance is provided between the ground and motor as well as between the motor and the load. Also, the load 138 includes the axial compliance device 142 to abut the projecting member 144 as described above.

Figure 21:
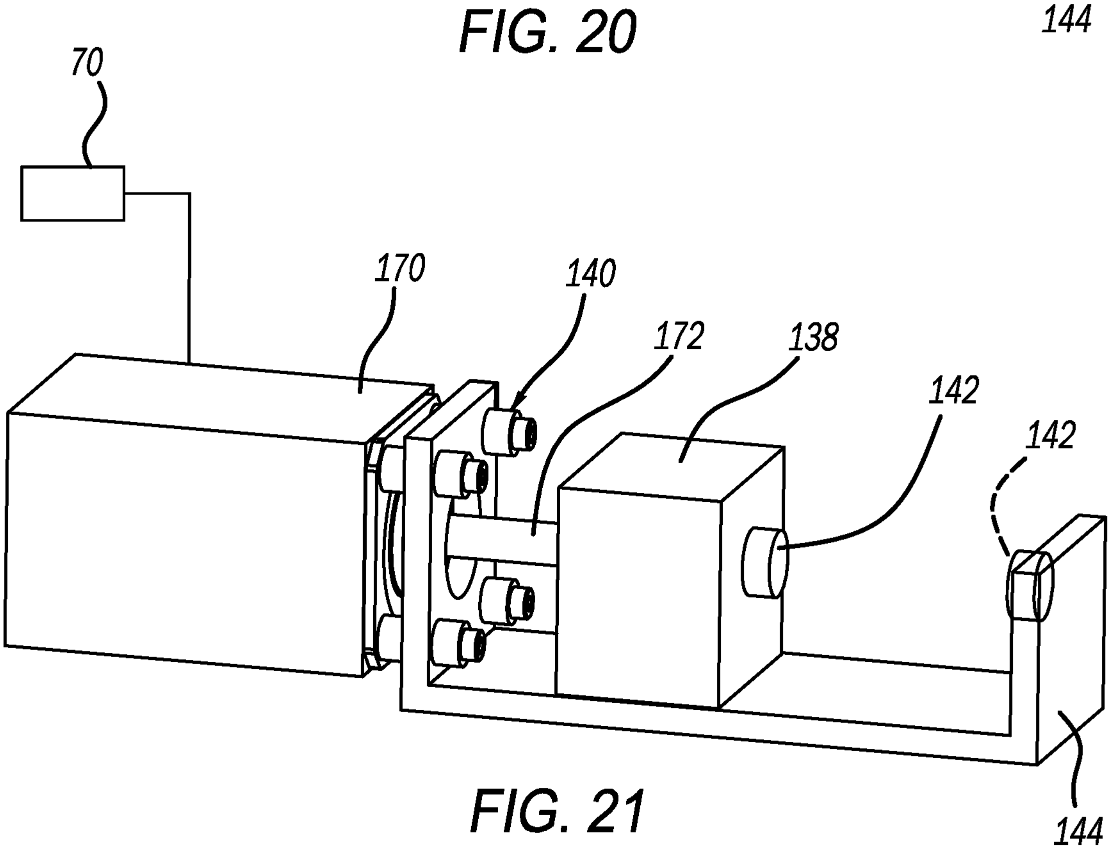
FIG. 21 is a schematic view like FIG. 20 with alternative compliance.

Turning to FIG. 21, the motor 170 is secured to ground via the bracket 114 through the axial compliance members 140. The axial shaft 172 is secured directly to the load 138. Also, the load 138 includes the axial compliance device 142 to abut the projecting member 144 as described above.

Figure 22:
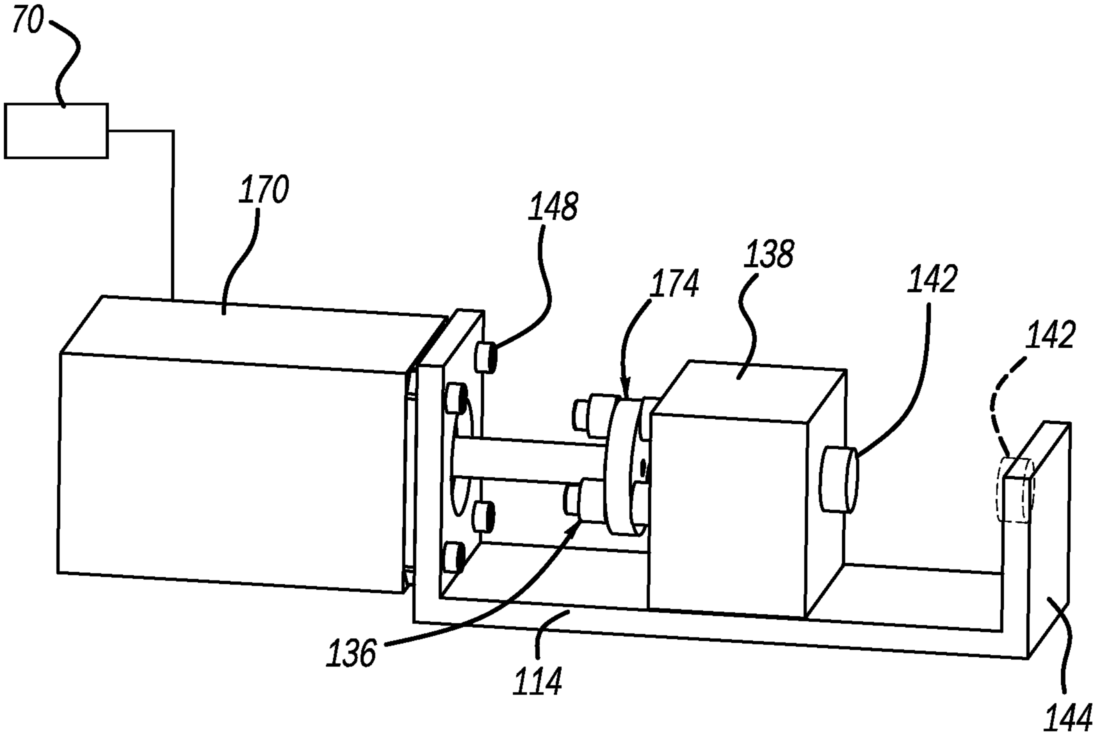
FIG. 22 is a schematic view like FIG. 20 with alternative compliance.

In FIG. 22, the motor 170 is secured to the bracket 114 via fasteners 148. The shaft 172 is secured to the load adapter 174 via axial compliance members 136. Also, the load 138 includes the axial compliance device 142 to abut the projecting member 144 as described above. Thus, the linear stepper motor 170 has an axial shaft motion wherein the motor is mounted to ground with axial compliance between the motor and the load and the load and ground.

Figure 23:
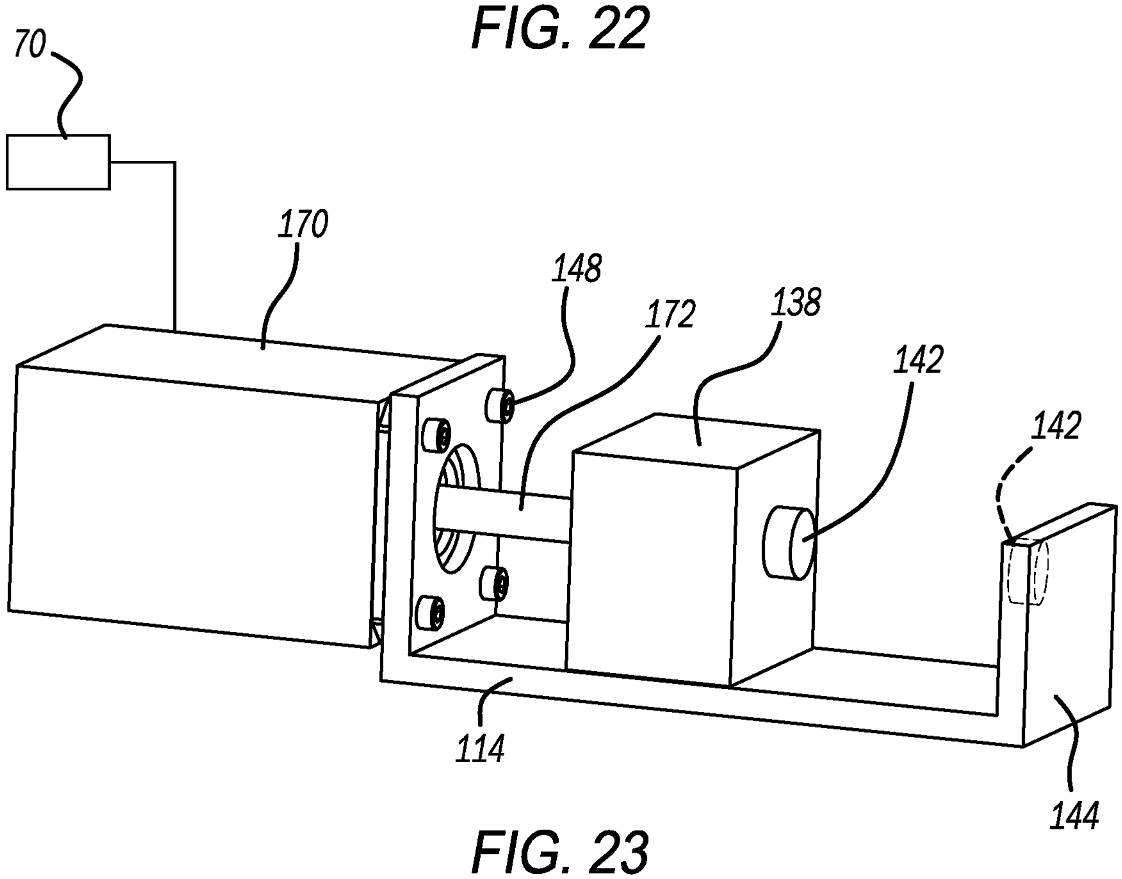
FIG. 23 is a schematic view like FIG. 20 with alternative compliance.

FIG. 23 illustrates the motor 170 secured by fasteners 148 to the bracket 114 and the shaft 172 is secured to the load 138. Also, the load 138 includes the axial compliance device 142 to abut the projecting member 144 as described above.

The motors are operated via the control as explained herein. Additionally, the compliance members are actuated and move as explained above.

In general, a load is any resistance to motion that requires force to overcome it. However, in some applications, the load is usually only applied at the end of movement securing an object.

Some examples of products that can be driven by the above stepper motor drive systems are grippers of which many type exist, power clamps of which many types exist, slide mechanisms with a payload mounted to a carriage that is supported by bearings, and feed escapements, etc. Another example is moving a load thru gravity in a vertical lifting application. Here, the figures would be rotated 90°.

Rotational actuation steppers systems can effectively be used on any device that requires a torque input to operate. The above stepper motor with compliance would cover most rotary electric motor applications that would move a load to a holding position. Some examples of products that can be driven by rotary motors are hoists, gates, clamps, valves and screwdrivers, etc.

Figure 24:
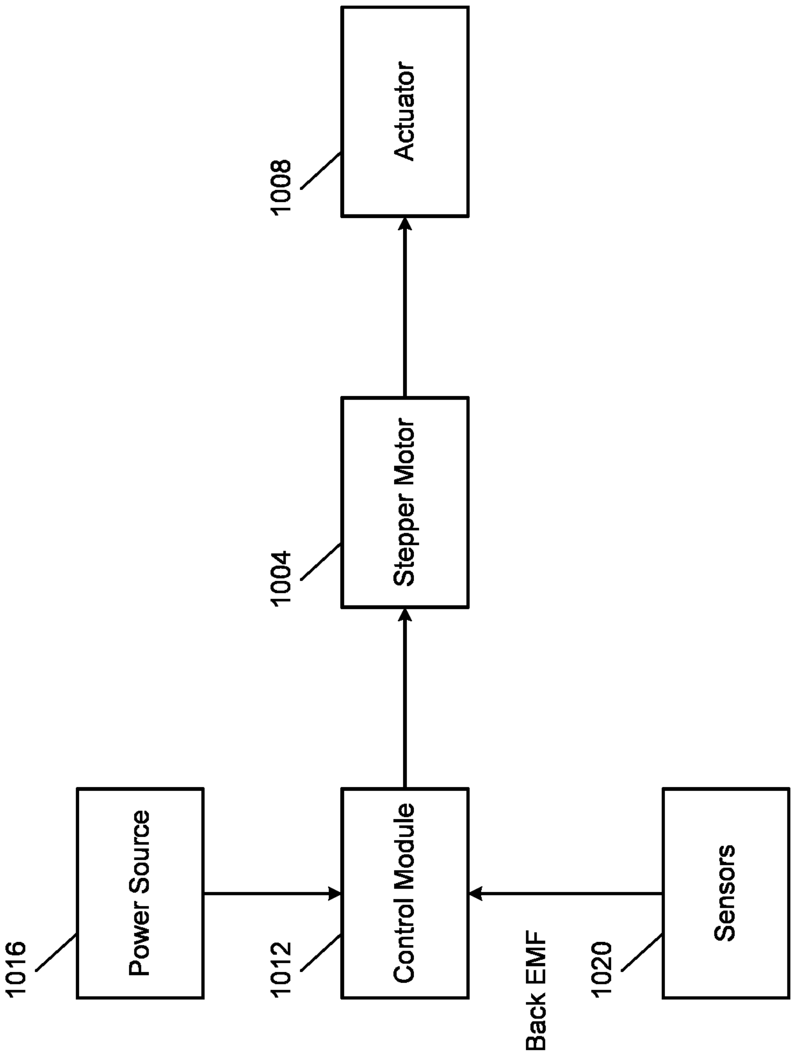
FIG. 24 is a functional block diagram of an example stepper motor control system.

FIG. 24 is a functional block diagram of an example stepper motor control system. As discussed above, a stepper motor 1004 is used to actuate an actuator 1008. The actuator 1008 may be the gripper as described above or another type of actuator that is actuated by the stepper motor 1004. The stepper motor 1004 may be a linear stepper motor or a rotary stepper motor as discussed above. While the example of grasping an object is provided, the present application is also applicable to other functions performable by the actuator 1008 using the stepper motor 1004.

The stepper motor 1004 may include two stator coils that drive rotation of a rotor that is coupled to an output shaft of the stepper motor 1004. Rotation of the output shaft of the stepper motor 1004 moves/actuates the actuator 1008. Each commutation (pulse) of the stepper motor 1004 coils drives rotation of the output shaft by a predetermined rotational angle, which may be referred to as a step. For example only, in many common stepper motors, commutating 200 times (moving 200 steps) will cause one complete rotation of the output shaft of the stepper motor. It is possible to further increase positional resolution by interpolating between commutations, which may be referred to as microstepping.

A control module 1012 switches power in pulses to the stepper motor 1004 to actuate the actuator 1008. The control module 1012 may apply pulses alternatingly between the coils and may vary the polarity of the pulses (e.g., coil A+, coil B+, coil A−, coil B−, and then back to A+, etc.). While the example of two coils is provided, the stepper motor 1014 may include a greater number of stator coils, and the control module 1012 may apply pulses to the coils in a predetermined order that repeats. For example, if the stepper motor 1004 includes three coils, the control module 1012 may apply a pulse to the first coil, next apply a pulse to a second coil, next apply a pulse to a third coil, next apply a pulse first coil, next apply a pulse to the second coil, etc. In this manner, the magnetic field generated by the stator coils rotates causing rotation of the output shaft in a first direction. The control module 1012 may apply pulses in reverse of the predetermined order to drive rotation of the output shaft in a second direction that is opposite the first direction.

The control module 1012 applies power (the pulses) to the stepper motor 1004 from a power source 1016. The pulses may be direct current (DC) pulses of a predetermined voltage (e.g., 12 Volts). The power source 1016 may be a DC power source (e.g., a battery) or an alternating current (AC) power source. In various implementations, the control module 1012 may include a voltage converter that converts AC power to DC power to apply DC pulses to the stepper motor 1004 or a voltage converter that converts DC power to AC power to apply AC pulses to the stepper motor 1004. The voltage converter may also boost (increase) and/or buck (decrease) voltage received to produce the pulses.

The control module 1012 controls the application of pulses to the stepper motor 1004 (and actuation of the actuator 1008) based on signals from sensors 1020. The sensors 1020 include back electromagnetic field (EMF) sensors (e.g., current shunts), such as one sensor per stator coil. The control module 1012 may detect the lag angle between the magnetic field of the stator and the position of the rotor by monitoring the back electromagnetic field voltage (back EMF) of the motor coils. This back EMF may be sensed through current shunts or another suitable type of back EMF sensor. When the lag angle increases, it may be inferred that the load on the motor has increased, and thus an approaching motor stall can be detected.

Figure 25:
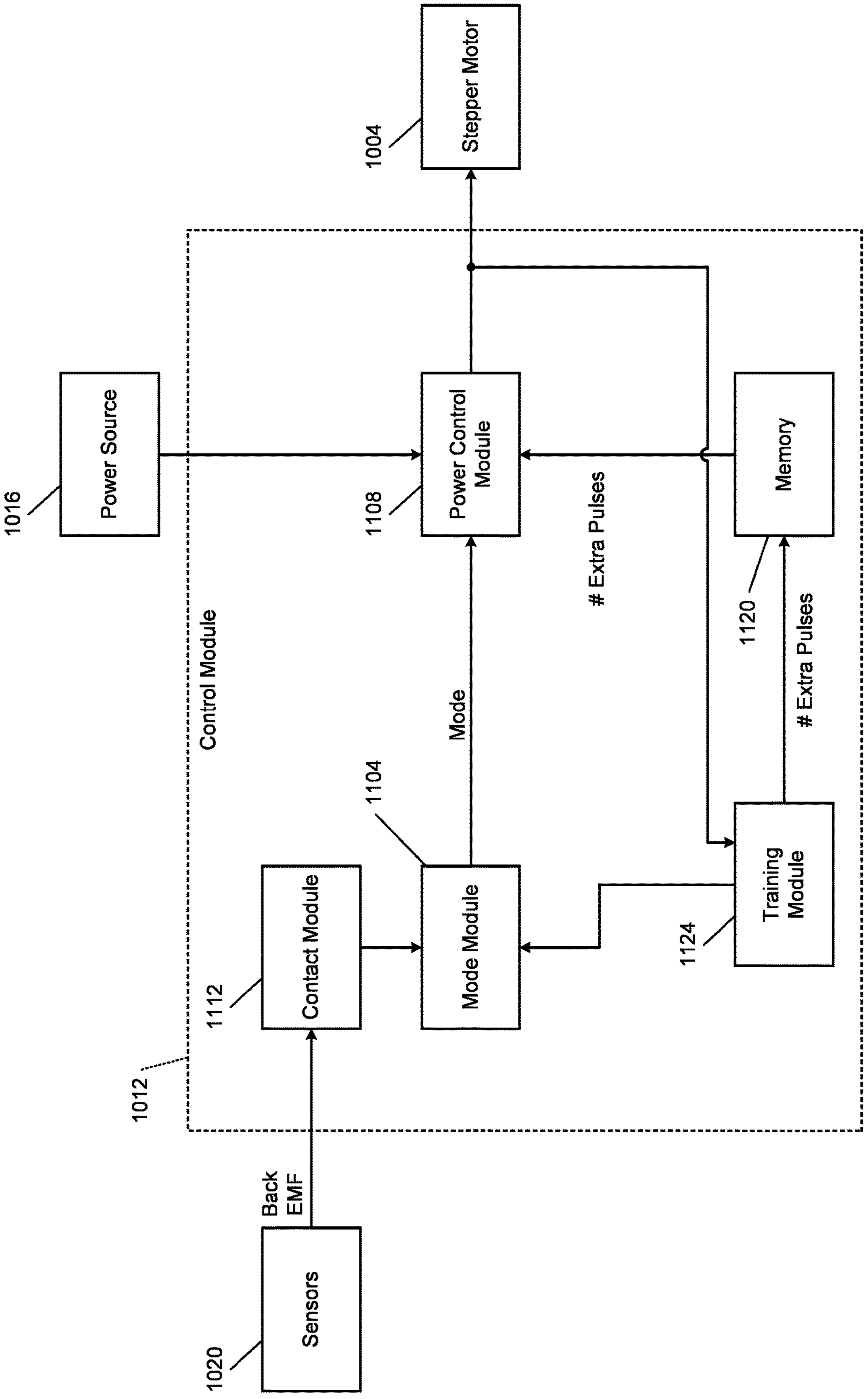
FIG. 25 is a functional block diagram of an example implementation of a control module for a stepper motor.

FIG. 25 is a functional block diagram of an example implementation of the control module 1012. A mode module 1104 sets a mode of operation for actuation of the actuator 1008. A power control module 1108 applies pulses to the stepper motor 1004 based on the mode of operation.

In various implementations, when the actuator 1008 is in a home position (orientation), the mode module 1104 may set the mode to a first mode (e.g., low torque and high speed). When the mode is in the first mode, the power control module 1108 applies pulses to the stepper motor 1004 based on moving the actuator toward an object at a first predetermined speed and a first predetermined torque. The first predetermined speed is greater than a second predetermined speed that will be used during operation in a second mode after the actuator contacts the object. The first predetermined torque is less than a second predetermined torque that will be used in the second mode. To move the actuator at the first predetermined speed and the first predetermined torque, the power control module 1108 may apply pulses to coils of a first predetermined current and at a first predetermined rate (e.g., pulse every X milliseconds where X is a value greater than 0). The first predetermined current is less than a second predetermined current that will be used in the second mode. The first predetermined rate is faster than a second predetermined rate (e.g., pulse every Y milliseconds where Y is a value greater than 0) that will be used in the second mode. Using the examples of X and Y above, X is less than Y.

The mode module 1104 may transition the mode from the first mode to the second mode when the actuator 1008 contacts the object to be manipulated (e.g., grasped). A contact module 1112 may take measurements to determine and indicate whether the actuator 1008 is contacting the object, such as the back EMF of a coil to which a pulse is not presently being applied. For example, the contact module 1112 may determine and indicate that the actuator 1008 is contacting the object when the back EMF of the coil that is not presently receiving power (inactive coil) is greater than or less than a predetermined threshold or is greater than or less than a predetermined rate of change ("threshold"). The predetermined back EMF threshold is a calibrated value. The contact module 1112 may receive the back EMF from the sensors 1020 or may measure the back EMF by connecting the motor coils through current shunts.

When the mode is in the second mode, the power control module 1108 applies a predetermined number of extra pulses to the stepper motor 1004 based on engaging the object using the second predetermined speed and the second predetermined torque. As stated above, the first predetermined speed is greater than the second predetermined speed, and the first predetermined torque is less than the second predetermined torque. To move the actuator at the second predetermined speed and the second predetermined torque, the power control module 1108 may apply pulses to coils of the second predetermined current and at the second predetermined rate. As stated above, the first predetermined current is less than the second predetermined current, and the first predetermined rate is faster than the second predetermined rate.

The power control module 1108 detects the pulses based on the output of the power control module 1108. The power control module 1108 may determine that a pulse is applied when an output (e.g., voltage, current) of the power control module 1108 increases by a predetermined amount. The output of the power control module 1108 may be measured by a sensor (e.g., one of the sensors 1020).

The power control module 1108 applies the predetermined number of extra pulses (#extra pulses, which may be referred to as overtravel) to the stepper motor 1004 based on firmly engaging (e.g., gripping/holding) the object. The power control module 1108 may retrieve the predetermined number of extra pulses from memory 1120. The predetermined number of extra pulses may be a calibrated or trained value and is greater than one. A training module 1124 may determine and store the predetermined number of extra pulses, such as discussed further below (see, e.g., FIG. 28).

After the predetermined number of extra pulses have been applied to the stepper motor 1004, the power control module 1108 may disconnect the stepper motor 1004 from power. Despite no power being applied to the stepper motor 1004, the stepper motor 1004 and/or one or more other mechanical failsafe devices prevent the actuator 1008 from disengaging (e.g., losing its grip of) the object. This decreases power consumption. Other types of electric motors may require that power be applied to prevent disengagement of the actuator 1008 from the object.

In various implementations, the object may be moved to a different location and/or processed in one or more manners. After the movement and/or processing, the power control module 1108 may apply pulses to the stepper motor 1004 to rotate the output shaft in the opposite direction and to return the actuator 1008 to the home position.

Figure 26:
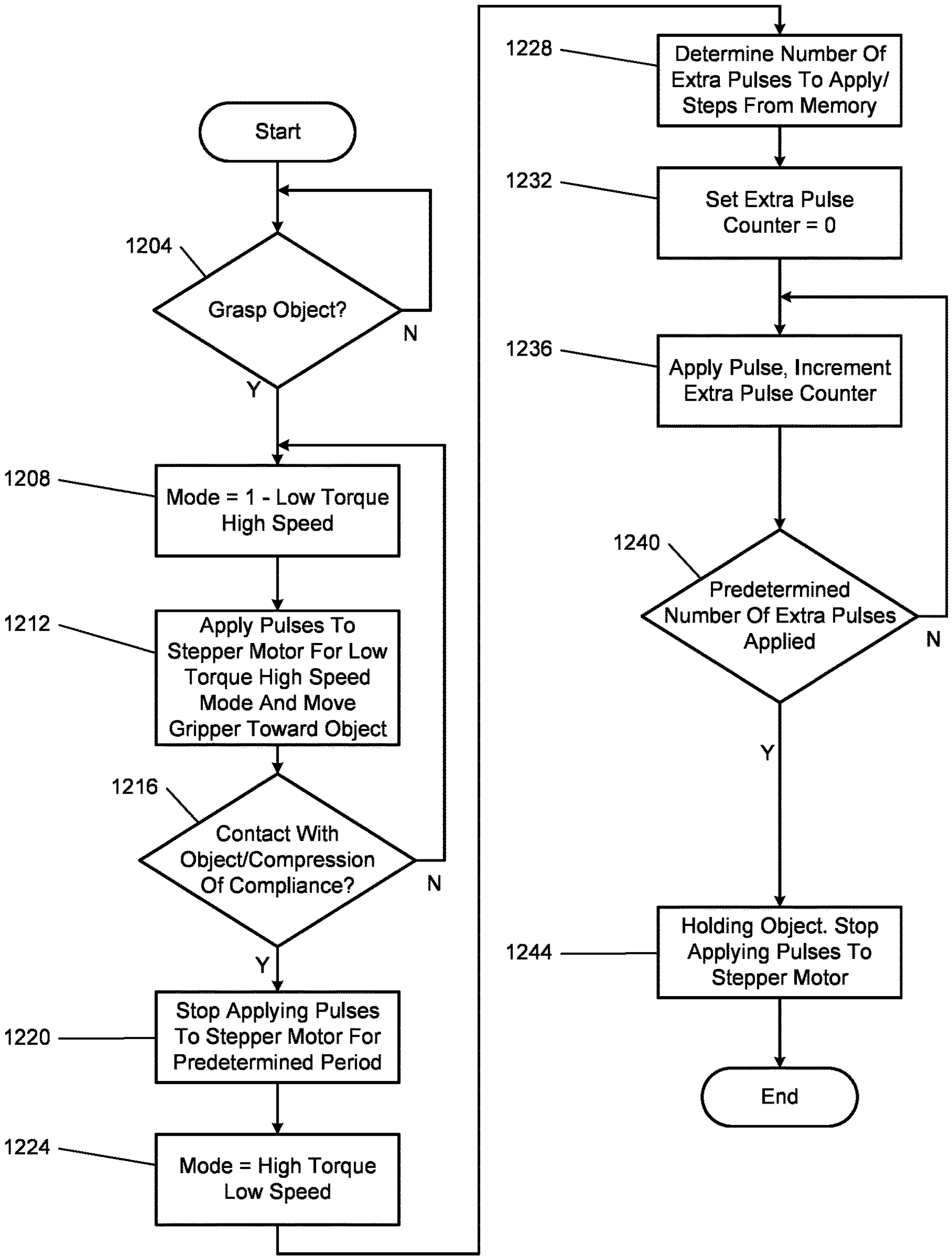
FIG. 26 is a flowchart depicting an example method of controlling the stepper motor and actuation of an actuator.

FIG. 26 is a flowchart depicting an example method of controlling the stepper motor 1004 and actuation of the actuator 1008. Control begins with the actuator 1008 and the stepper motor 1004 being in the home/initial position, such as fully open or fully closed. At 1204 the control module 1012 determines whether to engage (e.g., grasp) an object. For example, the control module 1012 may engage an object in response to receipt of user input to engage the object. If 1204 is true, control continues with 1208. If 1204 is false, control remains at 1204.

At 1208, the mode module 1104 sets the mode to the first mode. At 1212, the power control module 1108 applies pulses to the coils of the stepper motor 1004 in the predetermined order according to the first mode. This involves applying pulses to the stepper motor 1004 based on the first predetermined torque (low torque) and the first predetermined speed (high speed).

At 1216, the contact module 1112 determines whether the actuator 1008 is contacting the object and compression of the compliance mechanism has begun as described above. For example, the contact module 1112 may determine that compression of the compliance mechanism(s) has begun when the back EMF of a coil to which power is not presently being applied increases and/or is greater than or decreases and/or is less than a predetermined back EMF threshold. If 1216 is false, control returns to 1208. If 1216 is true, control continues with 1220.

At 1220, the power control module 1108 may stop applying pulses to the stepper motor 1004 for a predetermined period. At 1224, the mode module 1104 sets the mode to the second mode.

At 1228, the power control module 1108 determines the predetermined extra number of pulses to apply to the stepper motor, such as via retrieval from the memory 1120. At 1232, the power control module 1108 may set an extra pulse counter to zero. At 1236, the power control module 1108 applies a pulse to a coil of the stepper motor 1004 in the predetermined order with predetermined characteristics according to the second mode. The extra pulses may be based on the second predetermined torque and the second predetermined speed.

At 1240, the power control module 1108 determines whether the predetermined number of extra pulses have been applied to the stepper motor 1004. For example, the power control module 1108 may determine whether the extra pulse counter is equal to the predetermined number of extra pulses. If 1240 is true, control continues with 1244. If 1240 is false, control may return to 1236. At 1244, the actuator 1008 is engaging (e.g., gripping) the object. The power control module 1108 stops applying pulses to the stepper motor 1004 and electrically disconnects the stepper motor 1004 from power. The mechanical locking feature(s) then hold the engagement of the object while preventing additional electrical power consumption.

Figure 27:
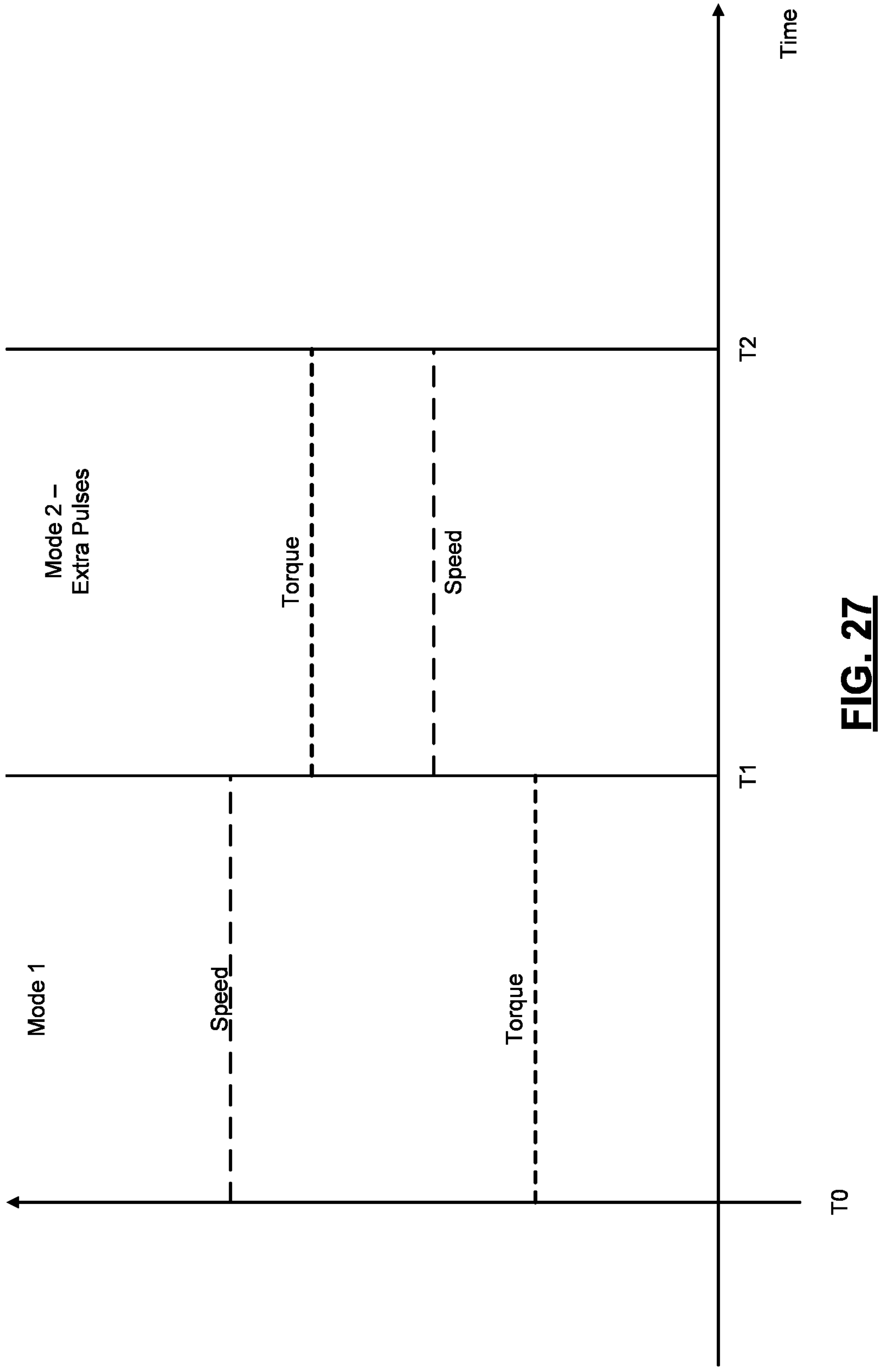
FIG. 27 is a graph of torque and speed over time.

FIG. 27 is a graph of torque and speed over time. As illustrated, pulses are applied to the stepper motor 1004 based on the first predetermined speed and the first predetermined torque when the mode is set to the first mode between time T0 and time T1. Extra pulses are applied to the stepper motor 1004 based on the second predetermined speed and the second predetermined torque when the mode is set to the second mode between time T1 and time T2. The second predetermined torque and the second predetermined speed may be used for the extra pulses.

Figure 28:
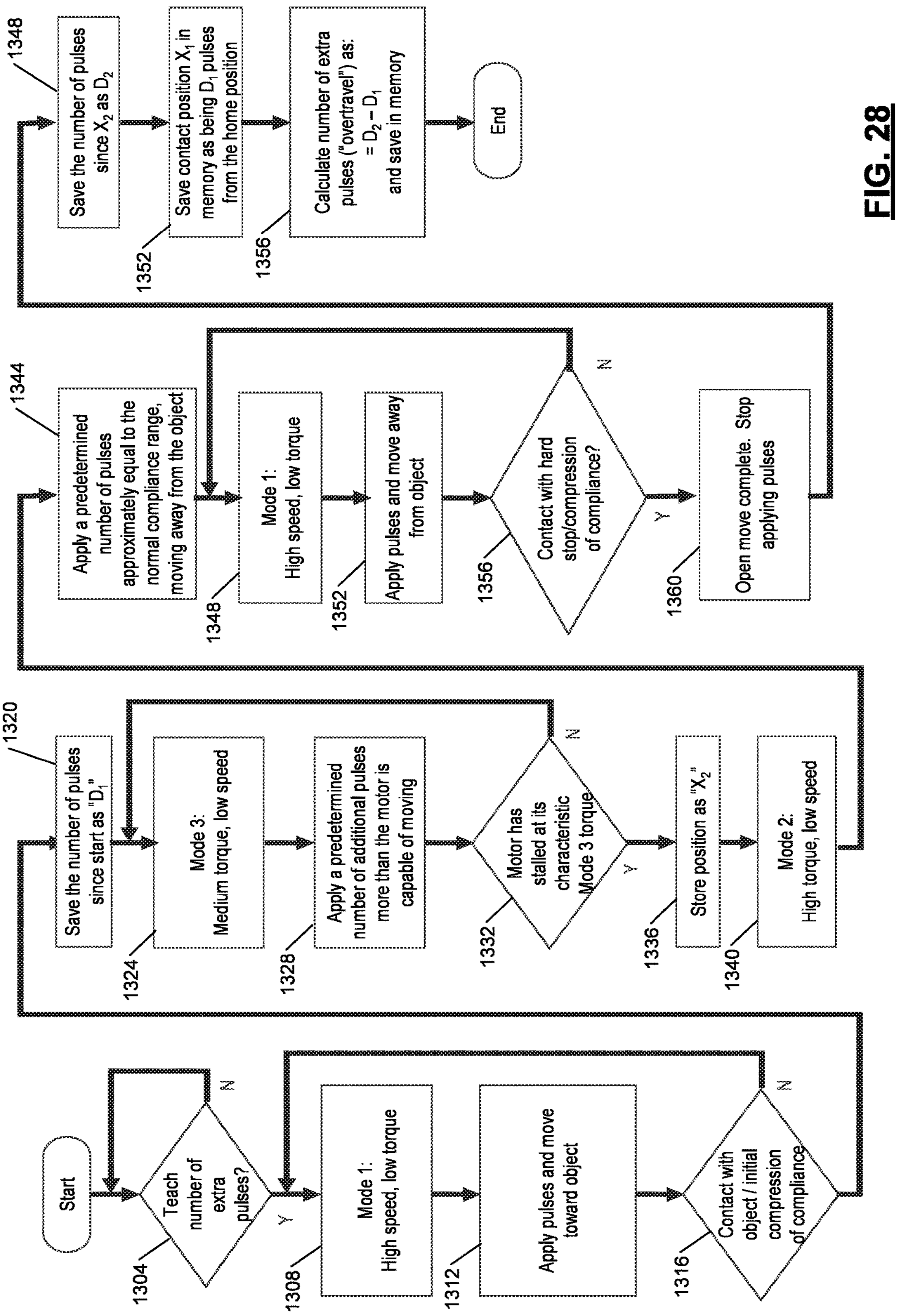
FIG. 28 is a flowchart depicting an example method of determining and setting the predetermined number of extra pulses to apply to the stepper motor 1004 during operation in the second mode.

FIG. 28 is a flowchart depicting an example method of determining and setting the predetermined number of extra pulses to apply to the stepper motor 1004 during operation in the second mode. Control begins with 1304 where the training module 1124 determines whether to train/learn/teach the predetermined number of extra pulses to apply to the stepper motor 1004. If 1304 is true, control continues with 1308. If 1304 is false, control remains at 1304.

At 1308, the mode module 1104 sets the mode to the first mode, and the power control module 1108 applies pulses to the stepper motor 1004 based on the first mode at 1312. At 1316, the contact module 1112 determines whether the actuator 1008 is contacting the object and compression of the compliance mechanism has begun as described above. For example, the contact module 1112 may determine that compression of the compliance mechanism(s) has begun when the back EMF of a coil to which power is not presently being applied increases and/or is greater than or decreases and/or is less than a predetermined back EMF threshold. If 1316 is false, control returns to 1308. If 1316 is true, control continues with 1320.

At 1320, the training module 1124 stores the number of pulses applied to the stepper motor 1004 since 1308 began as a first value (D1). At 1324, the mode module 1104 sets the mode to a third mode. When the mode is in the third mode, the power control module 1108 applies pulses to the stepper motor 1004 based on moving the actuator at a third predetermined speed and a third predetermined torque. The third predetermined speed may be equal to or less than the second predetermined speed and is less than the first predetermined speed. The third predetermined torque may be greater than the first predetermined torque and less than the second predetermined torque. To move the actuator at the third predetermined speed and the third predetermined torque, the power control module 1108 may apply pulses to coils of a third predetermined current and at a third predetermined rate (e.g., pulse every Z milliseconds where Z is a value greater than 0). The third predetermined current is less than the second predetermined current that will be used in the second mode. The third predetermined rate may be equal to or faster than the second predetermined rate (e.g., pulse every Z milliseconds where Z is a value greater than 0) that will be used in the second mode.

At 1328, the power control module 1108 applies a first predetermined number of pulses to the stepper motor 1004 in the predetermined order based on operation in the third mode. The first predetermined number of pulses is a predetermined calibrated value and may be a number that is more than the number of pulses (steps) that the stepper motor 1004 can currently move.

At 1332, the training module 1124 may determine whether the motor has stalled, such as based on whether the stepper motor 1104 has achieved the third predetermined torque. If 1332 is true, control may continue with 1336. If 1332 is false, control may return to 1324. At 1332, the mechanical locking captures progress and prevents back driving as the motor stalls. At this point, we've arrived at the maximum overtravel point. Next, how far the characteristic torque has deflected the total system (e.g., including compliance device, fingers, and workpiece, etc.) will be measured.

At 1340, the mode module 1104 sets the mode to the second mode. At 1344 the power control module 1108 applies a second predetermined number of pulses to the stepper motor 1004 based on operation in the second mode to move the actuator away from the object. The second predetermined number of pulses is a predetermined calibrated value and may be a number that is approximately equal to a (e.g., normal) compliance range of the compliance device.

At 1348, the mode module 1104 sets the mode to the first mode. At 1348 the power control module 1108 applies pulses to the stepper motor 1004 based on operation in the first mode to move the actuator away from the object and toward one or more hard stops at the home/initial position. At 1356, the training module 1124 may determine whether contact with the hard stop(s) has occurred. If 1356 is true, control continues with 1360. If 1356 is false, control returns to 1348.

At 1360, the power control module 1108 stops applying pulses to the stepper motor 1104 and actuation of the actuator to the home/initial position is complete. At 1348, the training module 1124 stores the number of pulses applied to the stepper motor 1104 since 1336 as a second value (D2). At 1352, the training module 1124 may store a contact position X1 in the memory 1120 as being the first number D1 of pulses from the home/initial position. At 1356, the training module 1124 may determine the number of extra pulses to apply to the stepper motor 1104 as discussed above based on the difference between the first and second numbers, such as based on or equal to D2-D1. The training module 1124 stores the number of extra pulses in the memory 1120 to be recalled during later use in interfacing objects.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" and the term "controller" and may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A stepper motor control system, comprising:

a stepper motor configured to actuate an actuator to engage an object;

a power control module configured to:

during a first period before compression of a compliance mechanism occurs, apply electrical pulses to stator coils of the stepper motor in a predetermined order and based on a first predetermined torque and a first predetermined speed, wherein compression of the compliance mechanism occurs when the actuator contacts the object; and during a second period after the compression of the compliance mechanism occurs, apply a predetermined number of extra pulses, in addition to the pulses applied during the first period, to the stator coils of the stepper motor in the predetermined order and based on a second predetermined torque and a second predetermined speed.

2. The stepper motor control system of claim 1, wherein the stepper motor is one of a linear stepper motor and a rotary stepper motor.

3. The stepper motor control system of claim 1 wherein the actuator is a gripper.

4. The stepper motor control system of claim 1 wherein the power control module is configured to apply the predetermined number of extra pulses to the stator coils of the stepper motor in the predetermined order based on the second predetermined torque and the second predetermined speed.

5. The stepper motor control system of claim 1 wherein the power control module is configured to apply the predetermined number of extra pulses to the stator coils of the stepper motor in the predetermined order based on a third predetermined torque that is one of less than and greater than the second predetermined torque.

6. The stepper motor control system of claim 1 wherein the power control module is configured to apply the predetermined number of extra pulses to the stator coils of the stepper motor in the predetermined order based on a third predetermined speed that is one of less than and greater than the second predetermined speed.

7. The stepper motor control system of claim 1 wherein the second predetermined torque is greater than the first predetermined torque.

8. The stepper motor control system of claim 1 wherein the first predetermined speed is greater than the second predetermined speed.

9. The stepper motor control system of claim 1 further comprising a contact module configured to indicate whether compression of the compliance mechanism is occurring based on a back electromagnetic field (EMF) voltage of one or more of the stator coils of the stepper motor.

10. The stepper motor control system of claim 9 wherein the contact module is configured to indicate that compression of the compliance mechanism is occurring when the back EMF voltage changes in a predetermined manner.

11. The stepper motor control system of claim 9 wherein the contact module is configured to indicate that compression of the compliance mechanism is occurring when the back EMF voltage is greater than a predetermined back EMF value.

12. The stepper motor control system of claim 11 wherein the contact module is configured to indicate that compression of the compliance mechanism is not occurring when the back EMF voltage is less than the predetermined back EMF value.

13. The stepper motor control system of claim 11 wherein the contact module is configured to indicate that compression of the compliance mechanism is not occurring when a rate of change of the back EMF voltage is one of less than and greater than a predetermined rate of change.

14. The stepper motor control system of claim 1 wherein the power control module is configured to apply electrical pulses to the stator coils of the stepper motor in the predetermined order and based on the second predetermined torque and the second predetermined speed until the predetermined number of extra pulses have been applied.

15. The stepper motor control system of claim 1 wherein:

the first predetermined torque corresponds to a first predetermined current of electrical pulses;

the second predetermined torque corresponds to a second predetermined current of electrical pulses; and the second predetermined current is greater than the first predetermined current.

16. The stepper motor control system of claim 1 wherein:

the first predetermined speed corresponds to a first predetermined rate of applying electrical pulses to the stepper motor;

the second predetermined speed corresponds to a second predetermined rate of applying electrical pulses to the stepper motor; and the first predetermined rate is faster than the second predetermined rate.

17. The stepper motor control system of claim 1 wherein the power control module is configured to disconnect the stepper motor from electrical power when the predetermined number of extra pulses have been applied to the stator coils of the stepper motor.

18. The stepper motor control system of claim 1 further comprising a training module configured to determine the predetermined number of extra pulses to apply to the stator coils during actuation of the actuator and to store the predetermined number of extra pulses in the memory.

19. The stepper motor control system of claim 18 wherein the training module is configured to determine the predetermined number of extra pulses to apply based on a difference between (a) a first number of pulses applied to the stepper motor during the first period and (b) a second number of pulses applied to the stepper motor between (i) when the second period began and (ii) the actuator contacted one or more hard stops.

20. A stepper motor control method, comprising:

during a first period before compression of a compliance mechanism occurs, applying electrical pulses to stator coils of a stepper motor in a predetermined order and based on a first predetermined torque and a first predetermined speed, wherein the stepper motor is configured to actuate an actuator to engage an object, and wherein compression of the compliance mechanism occurs when the actuator contacts the object; and during a second period after the compression of the compliance mechanism occurs, applying a predetermined number of extra pulses, in addition to the pulses applied during the first period, to the stator coils of the stepper motor in the predetermined order and based on a second predetermined torque and a second predetermined speed.

* * * * *